(12) United States Patent
Slettemoen

(10) Patent No.: US 11,908,147 B1
(45) Date of Patent: Feb. 20, 2024

(54) CALIBRATION AND MONITORING OF CAMERA POSITION AND LASER POSITION AND WAVELENGTH

(71) Applicant: Lumincode AS, Klaebu (NO)

(72) Inventor: Gudmund Slettemoen, Klæbu (NO)

(73) Assignee: LUMINCODE AS, Klaebu (NO)

( * ) Notice: Subject to any disclaimer, the term of this patent is extended or adjusted under 35 U.S.C. 154(b) by 0 days.

(21) Appl. No.: 17/966,006

(22) Filed: Oct. 14, 2022

(51) Int. Cl.
*G06T 7/521* (2017.01)
*G06T 7/80* (2017.01)

(52) U.S. Cl.
CPC ............... *G06T 7/521* (2017.01); *G06T 7/80* (2017.01)

(58) Field of Classification Search
CPC .................................. G06T 7/521; G06T 7/80
See application file for complete search history.

(56) References Cited

U.S. PATENT DOCUMENTS

| | | | | |
|---|---|---|---|---|
| 9,467,680 B2* | 10/2016 | Kimmel | ............... | H04N 13/167 |
| 10,323,927 B2* | 6/2019 | Stigwall | ............... | G01B 5/0014 |
| 10,930,013 B2* | 2/2021 | Boyle | ............... | G06T 7/344 |
| 11,146,735 B2* | 10/2021 | Guo | ............... | H04N 23/72 |
| 11,563,927 B2* | 1/2023 | Ren | ............... | G01B 11/2513 |
| 11,563,930 B2* | 1/2023 | Tang | ............... | G01S 17/86 |
| 11,763,491 B2* | 9/2023 | Ossig | ............... | H04N 23/67 |
| | | | | 348/136 |
| 2015/0172635 A1* | 6/2015 | Kimmel | ............... | H04N 13/25 |
| | | | | 348/51 |
| 2018/0174317 A1 | 6/2018 | Slettemoen | | |
| 2020/0033113 A1 | 1/2020 | Slettemoen | | |
| 2021/0001423 A1* | 1/2021 | Boillot | ............... | G06T 7/80 |
| 2023/0084728 A1* | 3/2023 | Liu | ............... | G06T 7/521 |
| | | | | 348/135 |
| 2023/0133662 A1* | 5/2023 | Moser | ............... | G01J 3/0297 |
| | | | | 356/72 |

\* cited by examiner

*Primary Examiner* — Brian P Yenke
(74) *Attorney, Agent, or Firm* — BUCHANAN, INGERSOLL & ROONEY PC

(57) ABSTRACT

A device for calibrating and monitoring the position displacement of a camera relative to a support. A device for calibrating and monitoring a laser wavelength shift and the laser position displacement relative to a support. A method for calibrating and monitoring the position displacement of a camera relative to a support. A method for calibrating and monitoring the laser wavelength shift and the laser position displacement relative to a support.

28 Claims, 14 Drawing Sheets

CALIBRATION AND MONITORING OF CAMERA POSITION AND LASER POSITION AND WAVELENGTH

TECHNICAL FIELD

The disclosure generally relates to the field of calibrating and monitoring the position displacement of a camera relative to a support, and the field of calibrating and monitoring the shift of a laser wavelength and the laser position displacement relative to a support.

BACKGROUND

Cameras are used in a range of applications where their precise position and observation direction is important. This may include applications from direct imaging of external scenes/objects to more elaborate applications where the scene/object is illuminated or equipped with features creating image structure. Likewise, are lasers used in applications where their precise position, pointing direction, and wavelength is important. This may include applications making structured patterns to beam scanning. In other applications cameras and lasers are combined where both the camera position and the laser position and wavelength need to be precise. But mechanical devices change internal position of their components with temperature, sometimes even in an uncontrollable manner resulting in slips between parts, etc. Depending on their use cameras generate variable amount of heat. Lasers typically change position with temperature and in addition shift wavelength with temperature in a staircase manner. When the variation of camera position and the variation of the laser wavelength and position is important sturdy camera and laser mounting may be sufficient. When sturdy mounting is not sufficient typically devices containing cameras and lasers are either temperature controlled or their 2-dimensional transversal positions/angles relative to their observation/illumination directions are measured against external targets, or both. However, since cameras and lasers generate heat, in addition to the variable temperature of the surroundings, some applications still need to be more accurately controlled. In that case long warmup periods and elaborate homing procedures may come into play. Related art also includes stabilizing the laser wavelength by means feedback electronics, intensity stabilization, cavity stabilization, or by use of internal spectral discriminator components like blazed gratings and Bragg cells. As light scattering angles are wavelength dependent, in general laser scattering apparatus depend on wavelength knowledge/control/measurement to operate properly. The same goes for interferometric apparatus where longitudinal measurements are directly proportional to the wavelength.

The present inventor is the named inventor of "Free space position finder" (Pub. No.: US 2018/0174317 A1) and "Position Finder apparatus and method using optically projected reference" (Pub. No.: US 2020/0033113 A1). These patent publications generally relate to deriving data for calibration and improving the positioning of computer-controlled machines like Coordinate Measuring Machines and Machine Tools. Devices based on these disclosures use cameras and lasers as key components. These devices may benefit from improving the long-term positioning of the cameras and lasers and the lasers wavelength.

Summary and Objectives

One objective of embodiments of the present disclosure is to accurately calibrate and monitor the 3-dimensional position of cameras, including or excluding observation optics, calibrate and monitor laser wavelength and the laser 3-dimensional position, including or excluding illumination optics, or in applications where both cameras and lasers are used, to accurately calibrate and monitor the camera position, laser position, and the laser wavelength. Another objective of embodiments of the present disclosure is to enable cameras and lasers to operate with high precision, even when external temperature and internally generated heat is changing, and to reduce the warmup period and homing and recalibration activities to a minimum. Yet another objective is to create a low-cost alternative to applications that rely on stabilizing the laser wavelength by means of for example feedback electronics, intensity stabilization, cavity stabilization, or by use of internal spectral discriminator components like blazed gratings and Bragg cells. Yet another objective is to improve the accuracy of devices that depend on the accurate measurement of light scattering angles and of interferometric apparatus that depend on accurate knowledge of wavelength to operate properly.

Embodiments of the present disclosure may achieve some or all these objectives. Additional or alternative objectives may be achieved by embodiments of the present disclosure.

One advantage of embodiments of the present disclosure is that the full 3-dimensional position of a camera, a laser, or the combination of a camera and a laser, is calibrated and monitored. Another advantage is that apparatus where the position of cameras and the position of lasers and laser wavelength need to be accurate/precise can be made compact and at a low cost. Yet another advantage is that apparatus that depend on position precision and laser wavelength precision, and that contain cameras and/or lasers, operate even when external temperature and internally generated heat is changing. The apparatus operates also when those changes take place during warmup or homing and recalibration activities. Yet another advantage is that apparatus according to the embodiments of the present disclosure works well in combination with other laser and camera use.

Embodiments of the present disclosure may achieve some or all these advantages. Additional or alternative advantages may be achieved by embodiments of the present disclosure.

DETAILED DESCRIPTION

Figure 1:
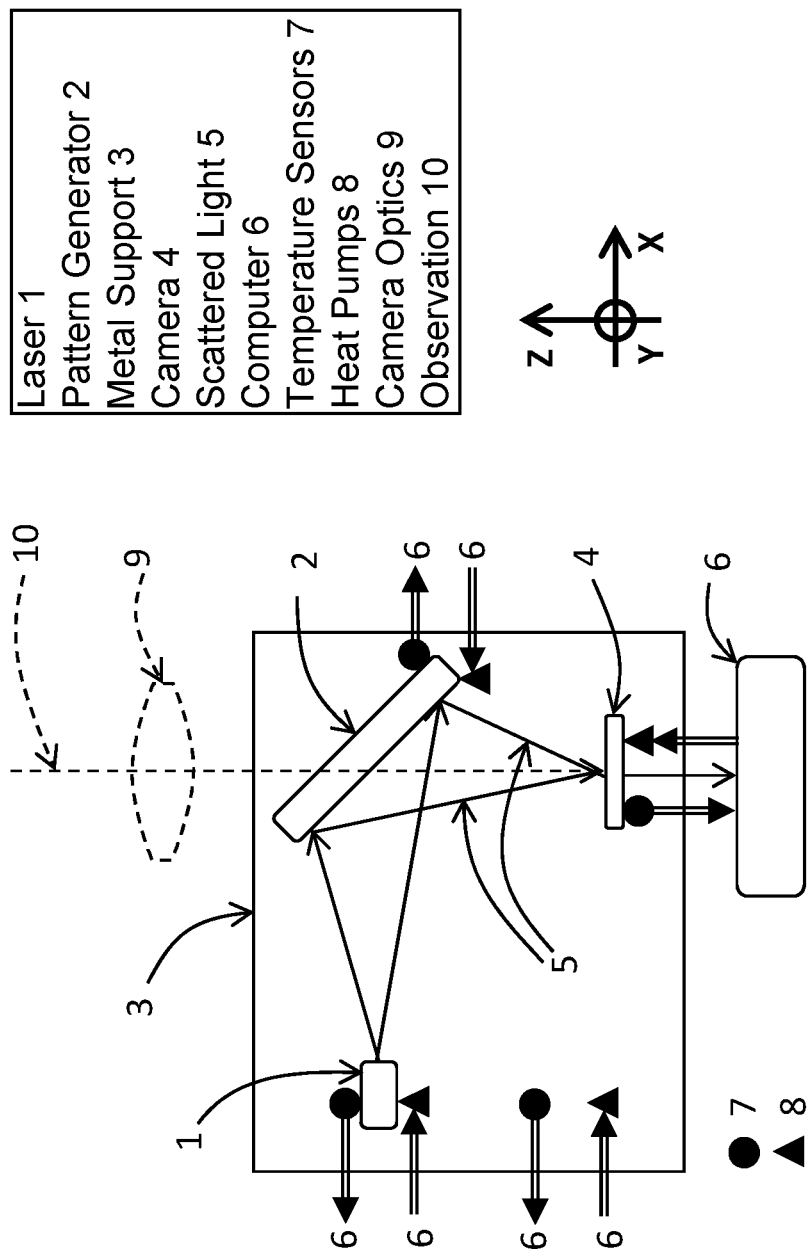
FIG. 1 is a schematic drawing illustrating an exemplary embodiment equipped with a device according to the present disclosure. The device is used to control and monitor the position of a camera placed in a post-objective arrangement.

Various examples and embodiments of the inventive subject matter disclosed here are possible and will be apparent to a person of ordinary skill in the art, given the benefit of this disclosure. In this disclosure reference to example, embodiment, and similar phrases each means that those embodiments are non-limiting examples of the inventive subject matter, and there may be alternative embodiments which are not excluded.

The different aspects, alternatives and embodiments of the invention disclosed herein can be combined with one or more of the other aspects, alternatives and embodiments described herein. Two or more aspects can be combined.

The articles "a," "an," and "the" are used herein to refer to one or more than one (i.e., to at least one) of the grammatical object of the article. By way of example, "an element" means one element or more than one element.

It should further be noted that any reference signs do not limit the scope of the claims, that the example aspects may be implemented at least in part by means of both hardware and software, and that several "means", "units" or "devices" may be represented by the same item of hardware.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description is not intended to be limiting of the invention.

Camera position in this disclosure means the position of the camera photosensitive surface, when referring to post objective applications, to the object side image of the camera photosensitive surface when referring to pre objective applications. If the object side position image of the camera photosensitive surface is far away from the camera the position may rather be expressed by its observation angles. Reference to the camera position and camera position displacement means either the position and position displacement of the photosensitive surface of the post objective applications, the object side image position and position displacement of the photosensitive surface of the pre objective applications, or the angular representations of those positions and displacements.

When this disclosure express that the laser, the pattern generator, the support, or the camera is equipped with a heat pump or a temperature sensor, this means that a heat pump or a temperature sensor is fastened to the components themselves or to the holders of these components.

The pattern generator can equally well either be observed by reflection or transmission. But for clarity all the drawings show observation by reflection.

In the figures, for clarity, all components are attached to the same support, but the laser and the camera can be attached to their own separate supports separate from the pattern generator support.

Laser position in this disclosure means the position of the smallest real or virtual beam waist when referring to pre laser optics applications, and to the image side smallest real or virtual beam waist when referring to post laser optics applications. Sometimes the smallest beam waist position of the post laser optics applications may favorably be expressed as laser pointing angles. But when this disclosure refers to the laser position and laser position displacement this means either the position of the smallest beam waist of the pre or post laser optics, or the angular positions and angular position displacements of this beam waist.

Example 1

Figure 2:
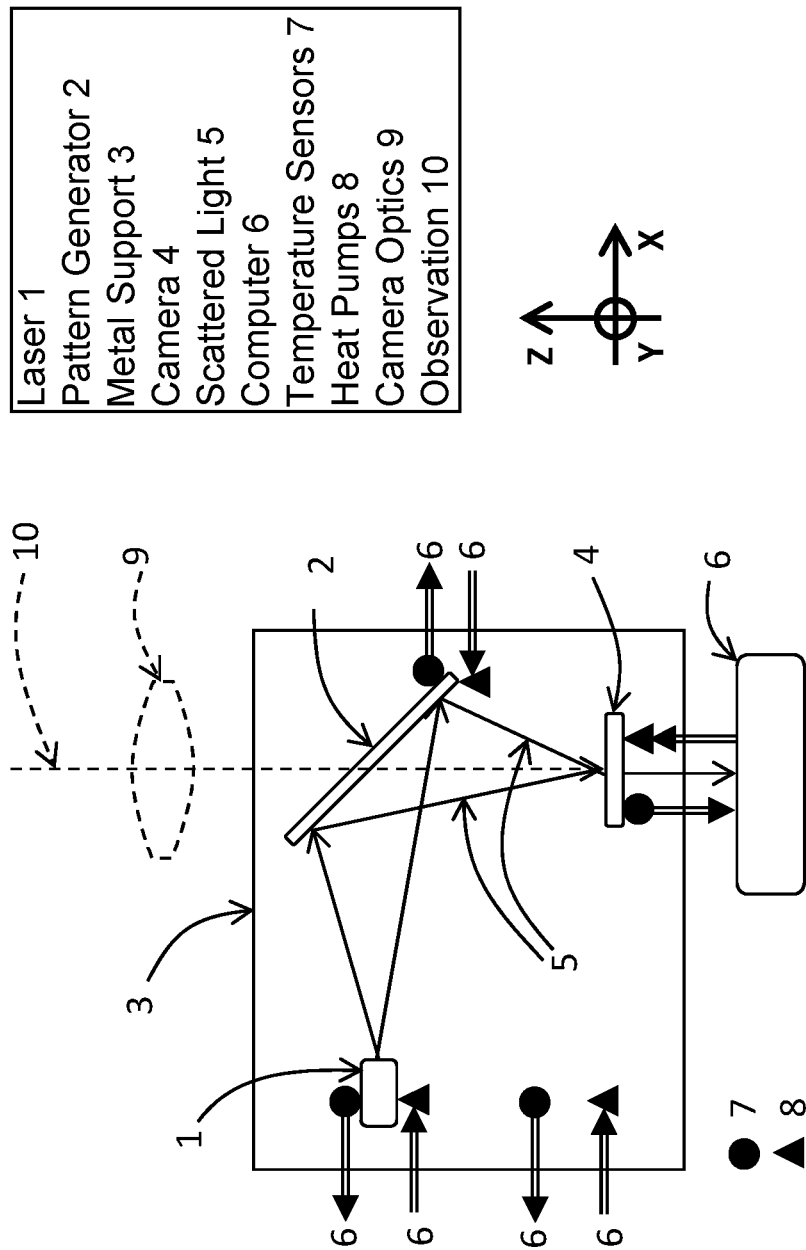
FIG. 2 is a schematic drawing illustrating an exemplary embodiment equipped with a device according to the present disclosure. The device is used to control and monitor the position of a camera placed in a post-objective arrangement.
Figure 3:
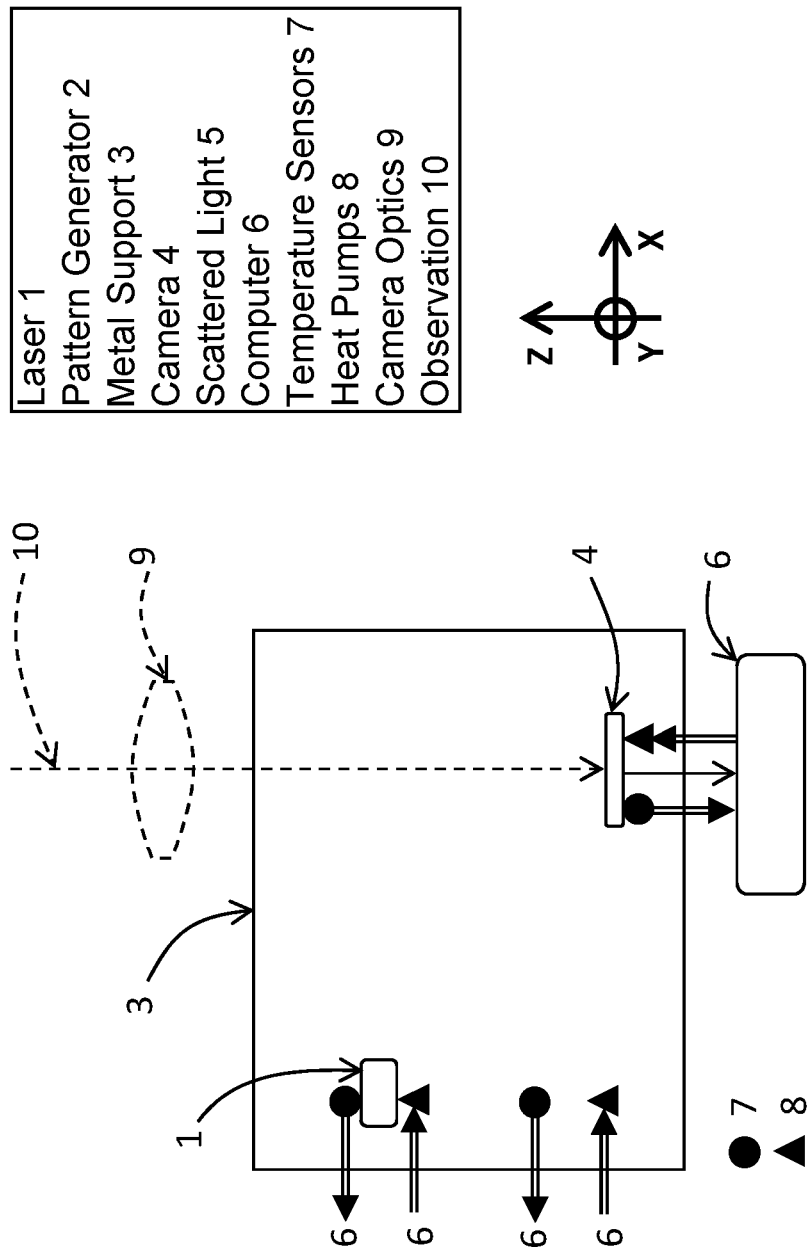
FIG. 3 is a schematic drawing illustrating an exemplary embodiment equipped with the monitoring part of a device according to the present disclosure. This part is used to monitor the position of a camera placed in a post-objective arrangement.

Embodiments of the disclosure is described with the reference to FIGS. 1-3. In this example 1 the embodiments all describe the calibration and monitoring of the 3-dimentional XYZ-position of a camera 4 where the calibration and monitoring is arranged in a post camera optics 9 geometry. FIGS. 1 and 2 show that the camera 4 is used in combination with camera optics 9 that is arranged to observe 10 some features in the surroundings, typically in connection with measurement applications like photogrammetry, diffractometry, or interferometry. The camera photosensitive surface 4 is fastened to a circuit board where a range of electronic components are located. The circuit board is itself fastened to a holder. Many of these electronic components generate heat. Due to thermal expansion and contraction this makes the position of the photosensitive surface an unreliable position reference for camera applications where the precise position plays a role. To calibrate and monitor the XYZ position of the camera 4 the laser 1 of FIGS. 1 and 2 illuminates the pattern generator 2. The laser 1 is a small semiconductor laser diode that is tightly mounted into a metal holder. That metal holder is fixed to a metal support 3. The pattern generator 2 in FIG. 1 is a sturdy scattering metal reflector that is fixed to the same support 3. The pattern generator 2 in FIG. 2 may also represent a computer-generated reflection mask, a stratified or not stratified diffractive optical element (DOE), or a computer-generated hologram (CGH). For illustration clarity FIG. 1 and FIG. 2 indicate a reflection geometry, but the pattern generator 2 may also be arranged in a transmission geometry. For critical applications the laser 1 holder, the pattern generator 2, and the support 3 are made of a material with low coefficient of thermal expansion like the 36-64% nickel-iron alloy and/or fused silica. Embodiments of the disclosure may work well if the material is for example aluminum, but then the temperature of the temperature sensors 7 plays a more important role in compensating for thermal expansion. This combination makes up the position reference for the camera 4. The pattern generator 2 of FIG. 1 combines the laser 1 light with the camera 4 observation 10 light through wavefront combination. I.e., the laser light is not obstruction the camera 4 observation 10 field of view light. See the patent "Position Finder apparatus and method using optically projected reference" (Pub. No.: US 2020/0033113 A1) that describes several apparatus and methods for coding the individual patterns to make their position recoverable from a composite pattern. The relevant disclosure of such from US 2020/0033113 A1 is hereby expressly incorporated by reference. In this specific embodiment the pattern generator 2 scatters the laser 1 light from two separate patches creating two individual patterns. The scattered light 5 propagates towards the camera 4 close to their respective zeroth order diffraction angles. The pattern generator 2 of FIG. 2 also combines the laser 1 light with the camera 4 observation 10 light through wavefront combination. In this specific embodiment the pattern generator 2 scatters the laser 1 light into two assemblies of patches creating two individual patterns, but in this embodiment the scattered light 5 propagates towards the camera 4 far from their respective zeroth order diffraction angles. The minimum angle between the patches, or assemblies of patches, is larger than $\arcsin(\lambda/4p)$, where $\lambda$ is the laser wavelength and p is the camera pixel size. FIGS. 1 and 2 show that one or all the laser 1, the pattern generator 2, the support 3, and the camera 4 can be equipped with temperature sensors 7 and heat pumps 8. The temperature sensors 7 are either thermistors or RTD (Resistance Temperature Detector), and the heat pumps 8 are Peltier elements or simply electronic resistors, all connected to the computer 6 as indicated in the FIGS.

A calibration sequence keeps the laser 1 and the camera 4 turned on and places the embodiments of FIG. 1 or FIG. 2 in a state of calibration by paying special attention to high mechanical stability and given/defined temperatures. Referring to FIG. 1 and FIG. 2 the laser 1, the pattern generator 2, the support 3, and the camera 4 can by computer 6 control and monitoring all be set to given temperature calibration states. The computer 6 sets the temperatures by controlling the power of the heat pumps 8 and reading the corresponding temperatures of the temperature sensors 7 by PID (Proportional, Integration, Derivation) control cycles. After the embodiments represented by FIG. 1 or FIG. 2 are set to their calibration conditions the computer 6 records these conditions by recording separately the camera 4 individual patterns, and concurrently with the recording of the temperatures of the temperature sensors 7 a camera 4 composite pattern minimum containing the individual patterns. Since this is a calibration sequence a multitude of sequences is favorably recorded to reduce random errors. To single out the different individual patterns a stop (not shown in the figures) is used to block/unblock the different contributions. The stop is moved manually, or by means of motors, magnets, or similar.

The computer 6 calculates the calibration XY-pattern position displacements of the individual pattern component relative to the corresponding patterns of the composite pattern. The patent "Position Finder apparatus and method using optically projected reference" (Pub. No.: US 2020/0033113 A1) describes several apparatus and methods for doing that. The relevant disclosure of such from US 2020/0033113 A1 is hereby expressly incorporated by reference. These displacements are represented by the four-element calibration vector vref. These individual pattern position displacements represent displacements that, when calculating subsequent pattern position displacements between the individual pattern and the corresponding subsequent composite patterns, should be subtracted from the individual pattern position displacements.

By use of optical scattering and diffraction equations the computer 6 relates the individual pattern positions, as recorded by the camera 4, to the laser wavelength and the exact geometrical relation between the laser 1, the pattern generator 2, and the camera 4. Optical scattering and diffraction equations are found in the reference "Speckle motions induced by rigid-body movements in free space geometry: an explicit investigation and extension to new cases, June 1979, Applied Optics 18(12):2022-32", and in its list of references. The computer 6 calculates pattern responsivity parameters by simulating displacements of the camera 4 in the XYZ-direction relative to the pattern generator 2, by simulating the shift of the laser 1 wavelength, and calculating the corresponding individual pattern position displacements as recorded by the camera 4. This results in a 4×4 responsivity matrix called R. To simulate changes outside the linear regime the optical scattering and diffraction equations should be repeated for a second exact geometrical relation that also will be called R.

In this example embodiments two monitoring sequences are described. The first embodiments are illustrated in FIG. 1 and FIG. 2. The second embodiment is illustrated in FIG. 3. In the first embodiment the computer 6 sets the temperatures to values close to the calibration values by controlling the power of the heat pumps 8 and reading the corresponding temperatures of the temperature sensors 7 by PID (Proportional, Integration, Derivation) control cycles. Whenever the camera 4 XYZ-position needs to be monitored the computer 6 records a composite pattern from the camera 4 concurrently with the temperature readings from the temperature sensors 7. The computer 6 calculates the monitoring XY-pattern position displacements of the calibration individual patterns relative to the corresponding patterns of the monitoring composite pattern. These displacements are represented by the four-element vector v. To find the camera 4 XYZ position displacement relative to the camera calibration position, and the wavelength shift, the vector difference (v-vref) is multiplied with the inverse responsivity matrix R. The geometry of FIG. 1 results in small dependence on laser wavelength and, in some cases, it may be neglected altogether. Then the responsivity matrix can be reduced to a 4×3 matrix representing the 4 independent individual pattern position displacements responses to the 3 camera XYZ position displacements. In that case the matrix inversion may benefit from the case of an overdetermined set of equation that can solved by the least square methods.

The temperature control shall ensure that additional displacements due to thermal displacement of the laser 1 position within its holder, the expansion of Laser 1 holder, the pattern generator 2 displacement relative to the support 3, are small and can be compensated for. This compensation applies additional data, recorded during calibration temperature offset measurements, and knowledge of components sizes and the thermal expansion coefficients of the materials used.

The second monitoring embodiment is illustrated in FIG. 3. As illustrated, although the calibration step depends on embodiments as for example illustrated in FIG. 1 and FIG. 2, in this embodiment the pattern generator 2 is removed and all monitoring depends on the temperature sensors 7. This is a practical approach if the pattern generator 2 during calibration blocks some or all the camera observation field of view that otherwise is needed for the camera observation 10. The computer 6 then sets the temperatures to values close to the calibration values by controlling the power of the heat pumps 8 and reading the corresponding temperatures of the temperature sensors 7 by PID (Proportional, Integration, Derivation) control cycles. Whenever the camera 4 XYZ-position needs to be monitored the computer 6 records the temperature from the temperature sensors 7. The temperature control shall ensure that additional displacements of the camera 4 position displacement, relative to the support 3, are small and can be compensated for. This compensation applies additional data recorded during calibration temperature offset measurements, and from knowledge of components sizes and the thermal expansion coefficients of the materials used. Note that although each of the temperature monitoring values are one-dimensional temperature readings the calibration ensures that through lookup the full camera 4 XYZ position displacement can be estimated. FIG. 3 shows that the laser 1 is in place, although it does not play an active monitoring role. But the fact that the laser 1 is in place, and is on, helps reduce uncertainties related to the estimation of the temperature distribution and the accuracy of resulting compensation. However, this monitoring embodiment will still work if also the laser 1 is removed.

Example 2

Figure 4:
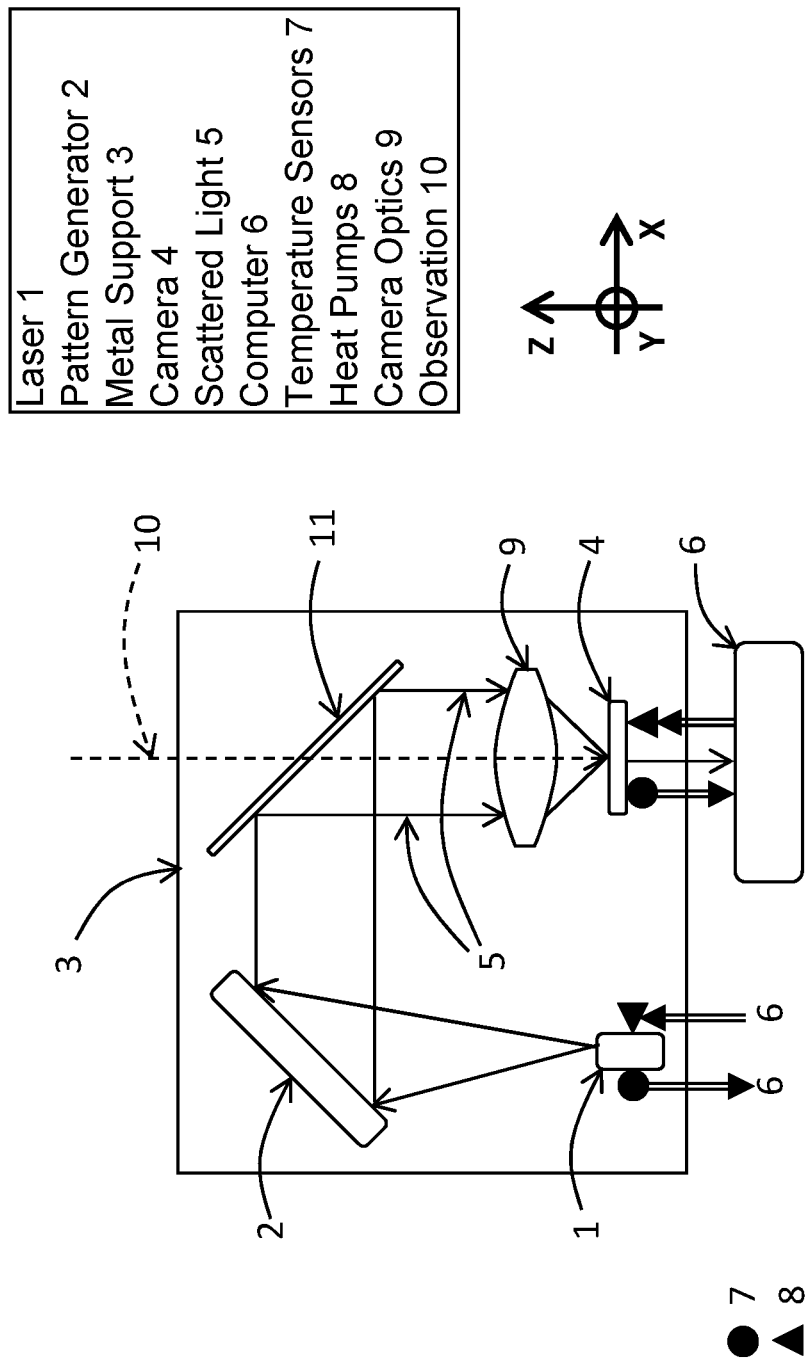
FIG. 4 is a schematic drawing illustrating an exemplary embodiment equipped with a device according to the present disclosure. The device is used to control and monitor the position of a camera placed in a pre-objective arrangement.
Figure 5:
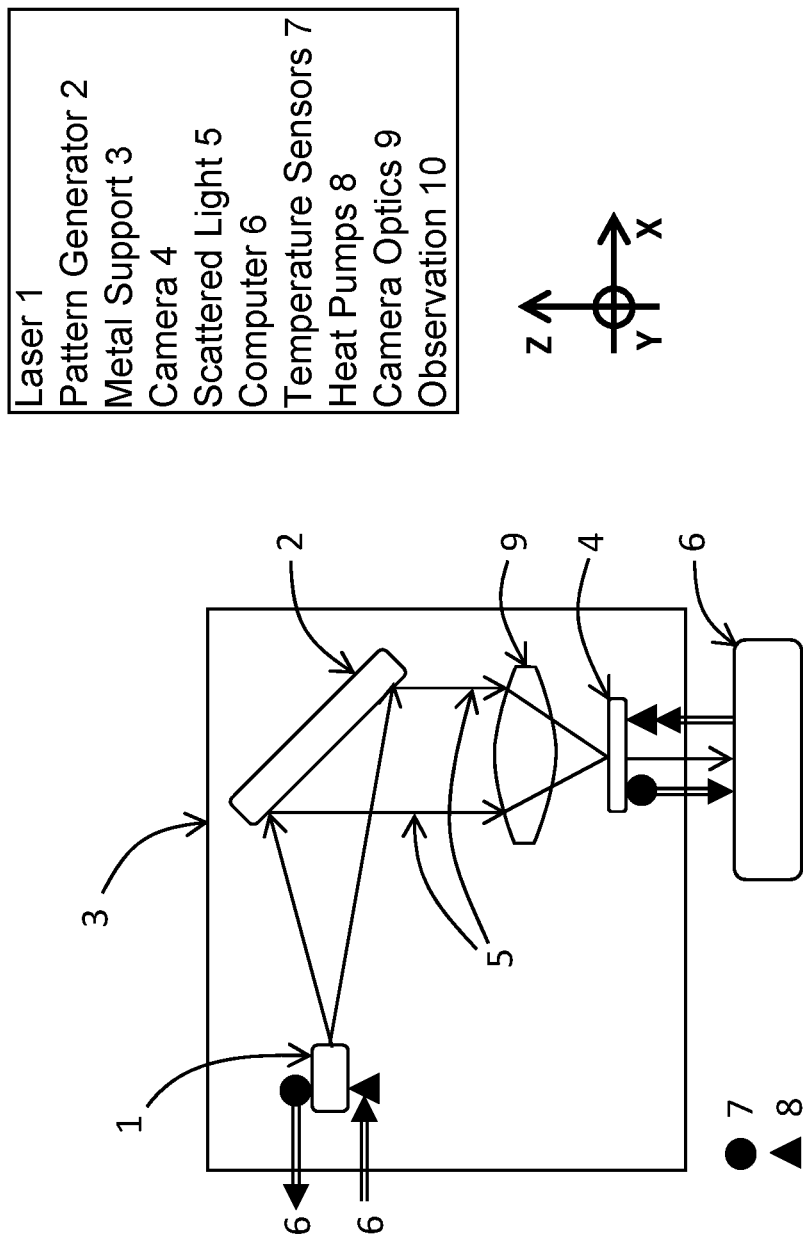
FIG. 5 is a schematic drawing illustrating an exemplary embodiment equipped with a device according to the present disclosure. The device is used to control and monitor the position of a camera placed in a pre-objective arrangement.
Figure 6:
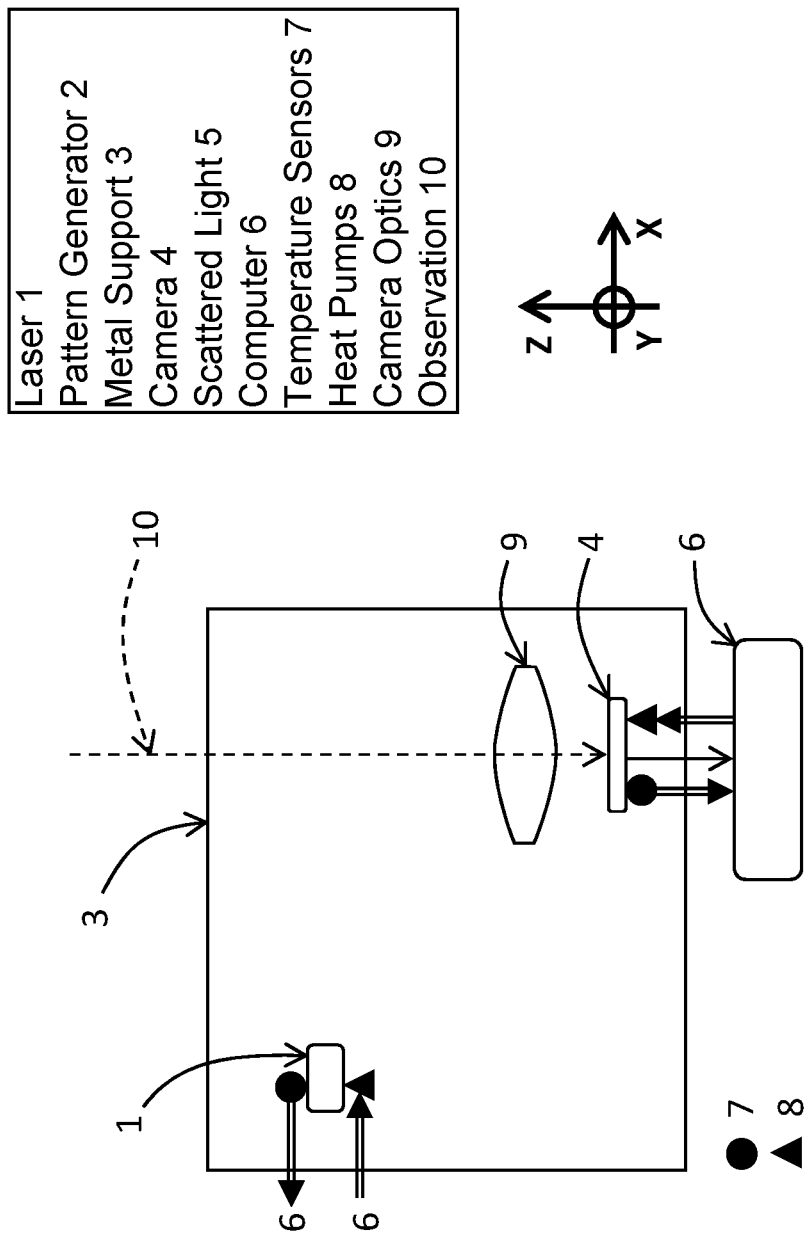
FIG. 6 is a schematic drawing illustrating an exemplary embodiment equipped with the monitoring part of a device according to the present disclosure. This part is used to monitor the position of a camera placed in a pre-objective arrangement.

Embodiments of the disclosure are described with the reference to FIGS. 4-6. The focus of this example 2 is to demonstrate how to calibrate and monitor a camera viewing direction where the combination of camera 4 and camera optics 9 is observing objects far from the camera. In this example the embodiments all describe the calibration and monitoring of the XY-position of the combined camera 4 and camera optics 9 arrangement where the calibration and monitoring is placed in a pre-camera optics 9 geometry. Consequently, this calibration and monitoring is tracking the object side image of the camera 4 photosensitive surface where the viewing direction is directly given by the object side XY-displacement and the distance to this object side image. FIG. 4 shows that the camera 4 is used in combination with camera optics 9 that is arranged to observe 10 some features in the surroundings, typically in connection with measurement applications like optical scanners, photogrammetry, and interferometry. The camera photosensitive surface 4 is fastened to a circuit board where a range of electronic components are located. The circuit board is itself fastened to a holder. Many of these electronic components generate heat. Due to thermal expansion and contraction this makes especially the position of the photosensitive surface an unreliable position reference for camera applications where the position plays a role. To calibrate and monitor the XY position of camera 4 the laser 1 of FIG. 4 illuminates the pattern generator 2 via a beam combiner 11 (conventionally called a beam splitter). The laser 1 is a small semiconductor laser diode that is tightly mounted into a metal holder. That metal holder is fixed to a metal support 3. The pattern generator 2 in FIG. 4 is a sturdy scattering metal reflector that is fixed to the same support 3 and made of the same material as the support 3. For illustration clarity FIG. 4 indicates a reflection geometry, but the pattern generator 2 may also be arranged in a transmission geometry. For critical applications the laser 1 holder, the pattern generator 2 and the support 3 are made of a material with low coefficient of thermal expansion like the 36-64% nickel-iron alloy and/or fused silica. The beam combiner 11 is made of fused silica. Embodiments of the disclosure may work well if the material is, for example, aluminum, but then the temperature of the temperature sensors 7 plays a more important role in compensating for thermal expansion. This combination of laser 1, pattern generator 2, and the beam combiner 11 makes up the position reference for the camera 4 (inclusive camera optics 9). The beam combiner 11 of FIG. 4 combines the laser 1 light with the camera 4 observation light through amplitude division. I.e., the laser light is not obstruction the camera 4 observation 10 field of view light. In this specific embodiment the pattern generator 2 scatters the laser 1 light from two patches that are arranged to create orthogonal states of polarization. This is accomplished by reflecting the light from patches, each combined with a linear polarizer that generates crossed linear polarized light between the two contributions. The individual patterns can be recorded separately or combined by use of a rotating polarizer in between the pattern generator 2 and the beam combiner 11. Note that the polarizers are not shown in the illustration of FIG. 4. Also see the patent "Position Finder apparatus and method using optically projected reference" (Pub. No.: US 2020/0033113 A1) that describes several apparatus and methods for coding the individual patterns to make their position recoverable from the composite pattern. The scattered light 5 propagates towards the camera 4 close to their respective zeroth order diffraction angles. FIG. 4 shows that in this embodiment the laser 1 and the camera 4 are equipped with temperature sensors 7 and heat pumps 8. The temperature sensors 7 are either thermistors or RTD (Resistance Temperature Detector), and the heat pumps 8 are Peltier elements or simply electronic resistors, all connected to the computer 6.

A calibration sequence keeps the laser 1 and the camera 4 turned on and places the embodiments of FIG. 4 in a state of calibration by paying special attention to high mechanical stability and given/defined temperatures. The laser 1 and the camera 4 can by computer 6 control and monitoring all be set to given temperature calibration states. The computer 6 sets the temperatures by controlling the power of the heat pumps 8 and reading the corresponding temperatures of the temperature sensors 7 by PID (Proportional, Integration, Derivation) control cycles. After the embodiment represented by FIG. 4 is set to its calibration condition the computer 6 records these conditions by recording separately the camera 4 individual patterns, and concurrently with the recording of the temperatures of the temperature sensors 7 a camera 4 composite pattern minimum containing the individual patterns. Since this is a calibration sequence several sequences are favorably recorded to reduce random errors.

To single out the different individual patterns a polarizer (not shown in the figures) is used to block/unblock the different contributions. The polarizer is rotated manually, or by means of motors, magnets, etc.

The computer 6 calculates the calibration XY-pattern position displacements of the individual pattern component relative to the corresponding patterns of the composite pattern. The patent "Position Finder apparatus and method using optically projected reference" (Pub. No.: US 2020/0033113 A1) describes several apparatus and methods for doing that. These displacements are represented by the four-element calibration vector vref. These individual pattern position displacements represent displacements that, when calculating subsequent pattern position displacements between the individual pattern and the corresponding subsequent composite patterns, should be subtracted from the individual pattern position displacements.

By use of optical scattering and diffraction equations the computer 6 relates the individual pattern positions, as recorded by the camera 4, to the laser wavelength and the exact geometrical relation between the laser 1, the pattern generator 2, and the camera 4. Optical scattering and diffraction equations are found in the reference "Speckle motions induced by rigid-body movements in free space geometry: an explicit investigation and extension to new cases, June 1979, Applied Optics 18(12):2022-32", and in its list of references. The computer 6 calculates pattern responsivity parameters by simulating displacements of the laser 1 in the XY-directions, and the camera 4 in the XY-directions, relative to the pattern generator 2, and calculating the corresponding individual pattern position displacements as recorded by the camera 4. This results in a 4×4 responsivity matrix called R. To simulate changes outside the linear regime the optical scattering and diffraction equations should be repeated for a second exact geometrical relation that also will be called R.

FIG. 5 illustrates an alternative embodiment of a pre-objective camera position calibration and monitoring. FIG. 5 illustrates the calibration configuration where the pattern generator blocks the camera view but otherwise is arranged to do the calibration as described by the reference to FIG. 4. FIG. 6 illustrates the corresponding monitoring configuration where the pattern generator 2 is removed and where only temperatures are monitored.

In this example embodiments two monitoring sequences are described. The first embodiment is illustrated in FIG. 4. The second embodiment is illustrated in FIG. 6. In the first embodiment the computer 6 sets the temperatures to values close to the calibration values by controlling the power of the heat pumps 8 and reading the corresponding temperatures of the temperature sensors 7 by PID (Proportional, Integration, Derivation) control cycles. Whenever the camera 4 XY-position needs to be monitored the computer 6 records a composite pattern from the camera 4 concurrently with the temperature readings from the temperature sensors 7. The computer 6 calculates the monitoring XY-pattern position displacements of the calibration individual patterns relative to the corresponding patterns of the monitoring composite pattern. These displacements are represented by the four-element vector v. To find the camera 4 XY position displacement relative to the camera calibration position the vector difference (v-vref) is multiplied by the inverse responsivity matrix R. By this mean possible laser 1 XY position displacements are taken care of and eliminated. In this example embodiment the camera 4 XY position displacements represent basically, when imaged by the camera optics/objective 9 into the object space, viewing directions.

The temperature control shall ensure that additional displacements due to thermal displacement of the laser 1 position within its holder, the expansion of Laser 1 holder, the pattern generator 2 displacement relative to the support 3, are small and can be compensated for. This compensation applies temperature data, recorded during calibration temperature offset measurements, and knowledge of components sizes and the thermal expansion coefficients of the materials used.

The second monitoring embodiment is illustrated in FIG. 6. The corresponding calibration step is assumed to be represented by the calibration embodiment illustrated in FIG. 5, where the pattern generator 2 is blocking the camera 4 field of view, the pattern generator 2 is removed and all monitoring depends on the temperature sensors 7. The computer 6 then sets the temperatures to values close to the calibration values by controlling the power of the heat pumps 8 and reading the corresponding temperatures of the temperature sensors 7 by PID (Proportional, Integration, Derivation) control cycles. Whenever the camera 4 XY-position needs to be monitored the computer 6 records the temperature from the temperature sensors 7. The temperature control shall ensure that additional displacements to the camera 4 position displacement, relative to the support 3, are small and can be compensated for. This compensation applies temperature data, recorded during calibration temperature offset measurements, and knowledge of components sizes and the thermal expansion coefficients of the materials used. Note that although each of the temperature monitoring values are one-dimensional the calibration pattern displacement recordings ensure that through lookup the full camera 4 XY position displacement can be estimated. FIG. 6 shows that the laser 1 is in place, although it does not play an active monitoring role. But the fact that the laser 1 is in place, and is turned on, helps reduce uncertainties related to the estimation of the temperature distribution and the accuracy of the resulting compensation. However, this monitoring embodiment will still work if also the laser 1 is removed.

Example 3

Figure 7:
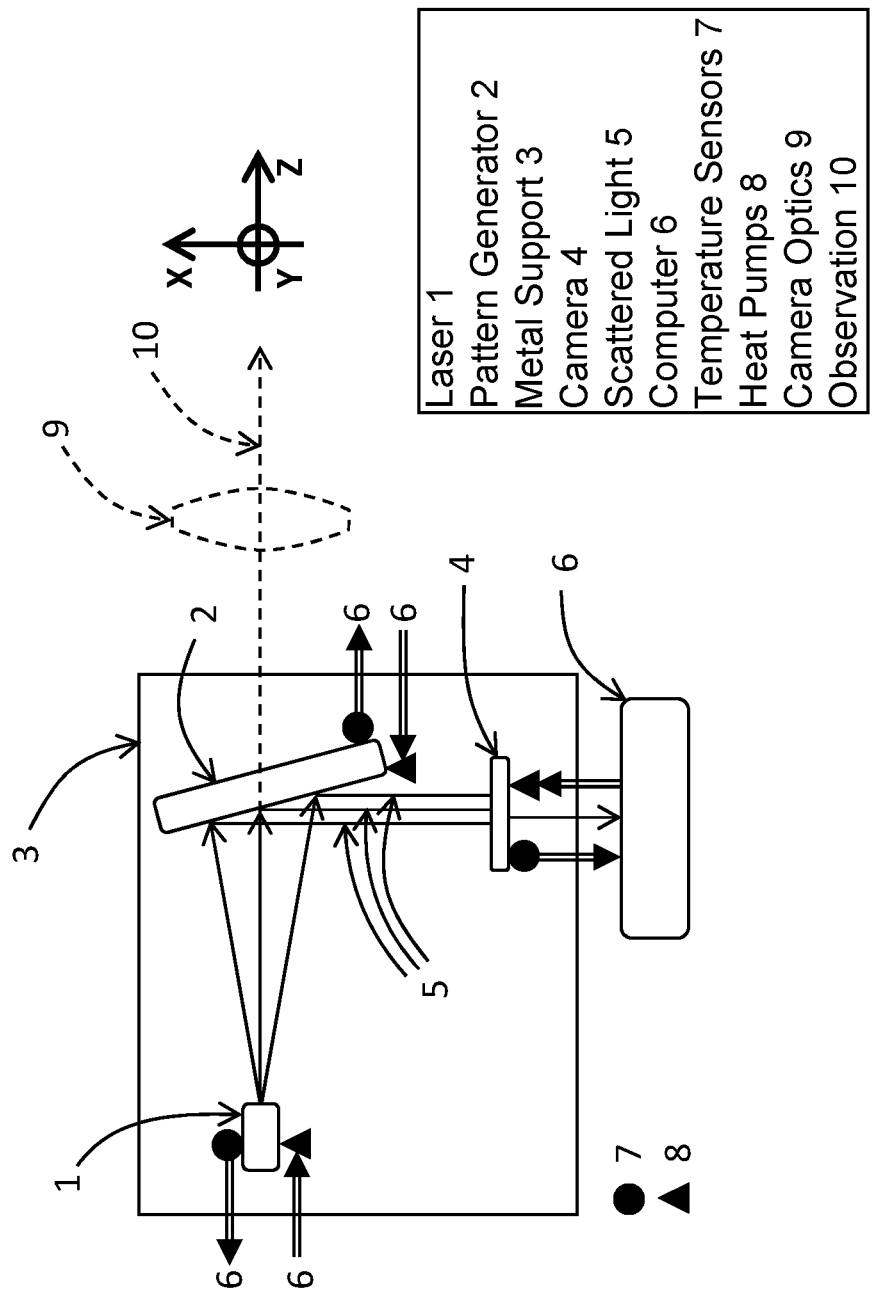
FIG. 7 is a schematic drawing illustrating an exemplary embodiment equipped with a device according to the present disclosure. The device is used to control and monitor the wavelength and position of a laser placed in a pre-illumination optics arrangement.
Figure 8:
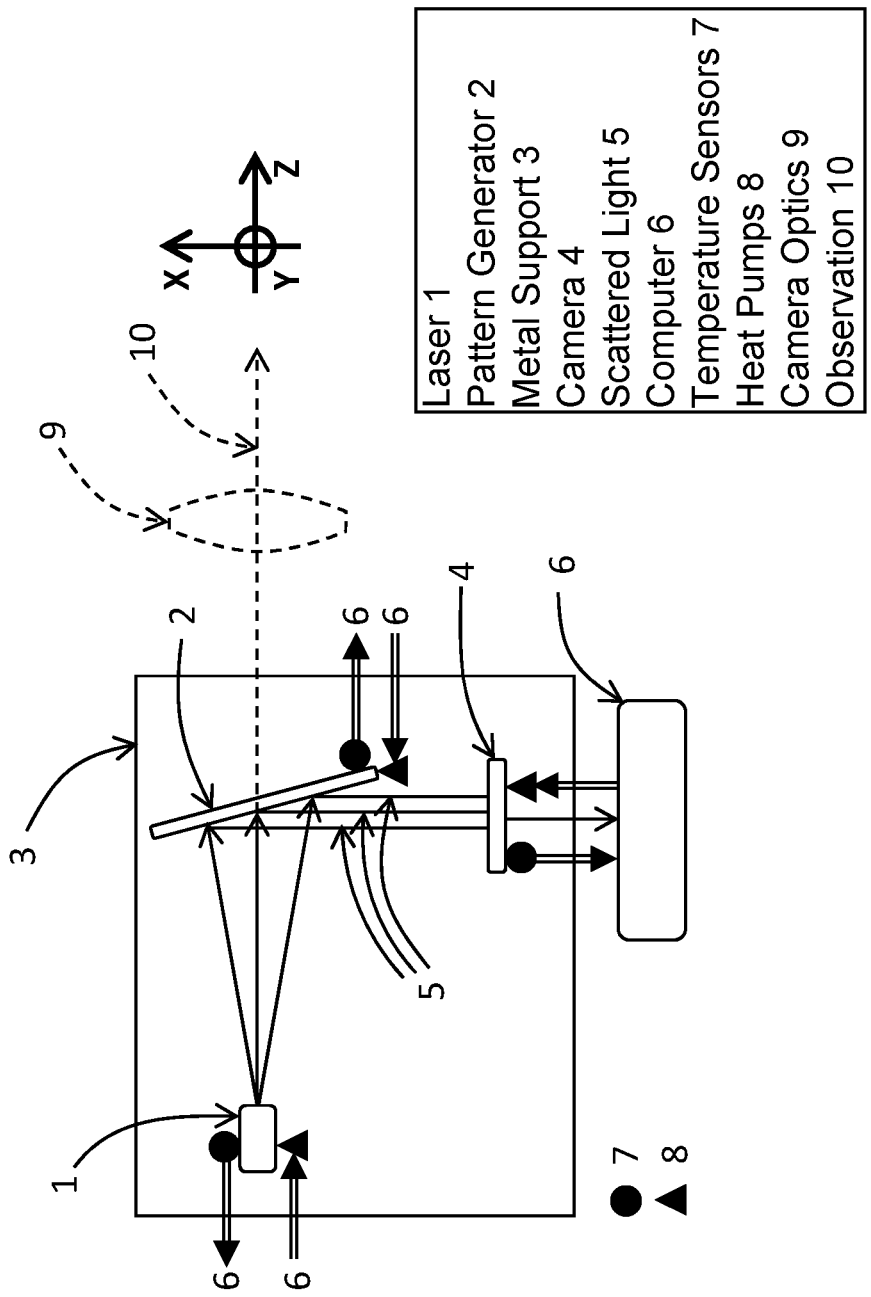
FIG. 8 is a schematic drawing illustrating an exemplary embodiment equipped with a device according to the present disclosure. The device is used to control and monitor the wavelength and position of a laser placed in a pre-illumination optics arrangement.
Figure 9:
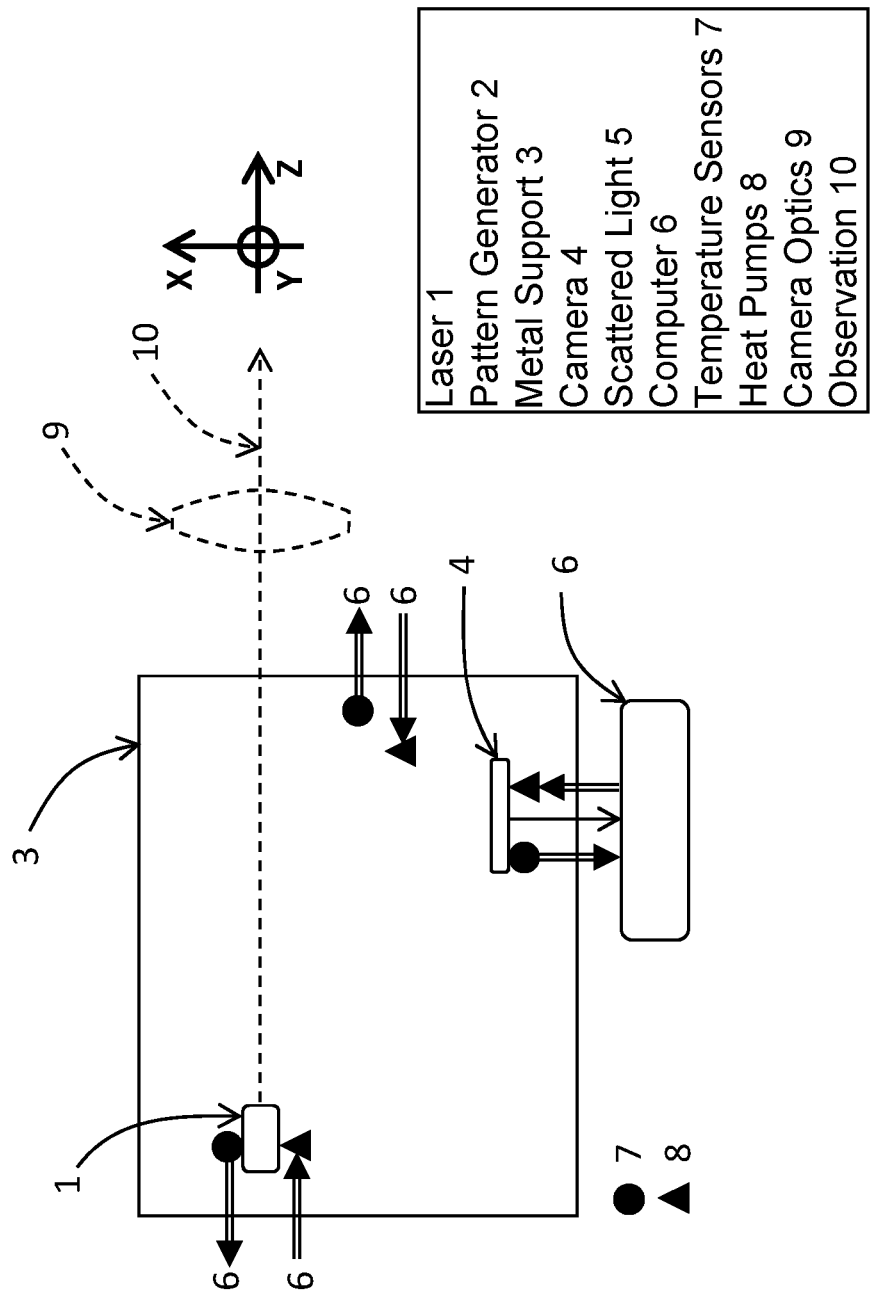
FIG. 9 is a schematic drawing illustrating an exemplary embodiment equipped with the monitoring part of a device according to the present disclosure. This part is used to monitor the wavelength and position of a laser placed in a pre-illumination optics arrangement.

Embodiments of the disclosure is described with the reference to FIGS. 7-9. In this example 3 the embodiments describe the calibration and monitoring a laser wavelength and the 3-dimensional XYZ-position of the laser 1, where the calibration and monitoring is arranged in a pre-illumination optics 9 geometry. FIGS. 7 and 8 shows that the laser 1 is used in combination with illumination optics 9 that is arranged to illuminate 10 some features in the surroundings, typically in connection with measurement applications like laser pointing, laser triangulation, interferometry, pattern projection, and spectroscopy. In this example the laser 1 is fastened to a holder and the camera photosensitive surface 4 is fastened to a circuit board where a range of electronic components are located. The laser 1 is generating heat and the laser 1 wavelength depends on its temperature. The present example aims at compensating for those dependencies. The camera circuit board is itself fastened to a holder. Many of these electronic components also generate heat. Due to thermal expansion and contraction this makes the position of the photosensitive surface an unreliable position reference. This example shows how to circumvent that shortcoming. To calibrate and monitor the laser 1 wavelength shift and its XYZ position displacement the laser 1 of FIGS. 7 and 8 illuminates the pattern generator 2. The laser 1 is a small semiconductor laser diode that is tightly mounted into a metal holder. That metal holder is fixed to a metal support 3. The pattern generator 2 in FIG. 7 is a sturdy scattering metal reflector that is fixed to the same support 3. The pattern generator in FIG. 8 is a computer-generated reflection mask, a stratified or not stratified diffractive optical element (DOE), or a computer-generated hologram (CGH). For illustration clarity FIG. 7 and FIG. 8 indicate a reflection geometry, but the pattern generator 2 may also be arranged in a transmission geometry. For critical applications the laser 1 holder, the pattern generator 2, and the support 3 are made of a material with low coefficient of thermal expansion like the 36-64% nickel-iron alloy and/or fused silica, otherwise other material like aluminum and other material can be used. This combination makes up the position reference for the laser 1.

The pattern generator 2 of FIG. 7 splits, through wavefront splitting, the laser 1 light into the light representing the individual pattern 5 and the laser illumination path 10 light. I.e., the pattern generator 2 is not obstructing the laser illumination path 10. In this specific embodiment the pattern generator 2 scatters the laser 1 light from three separate patches creating three individual patterns. These patches are geometrically arranged to have maximum sensitivity to the laser XYZ position displacement and laser wavelength shift, but minimum sensitivity to the camera axial X displacement. This can be accomplished by letting one of the individual patterns, represented by one of the scattered light 5 components, propagate towards the camera 4 close to its zeroth order diffraction angle. Each of the two other individual patterns, represented by the two other scattered light 5 components, propagates towards the camera 4 far from its zeroth order diffraction angles, but with opposite diffraction angles. Two of the laser 1 light exit angles components should be as large as possible, and the entrance angles of the scattered light 5 towards the camera 4 should preferably be small and according to a stop arrangement. The light paths 5 are arranged, by use of the stop arrangement not shown in FIG. 7, to not overlap on the camera 4 photosensitive surface. Note that the FIG. 7 is a 2-dimensional projection, but the three patches are arranged along a circle as seen from the laser 1. See the patent "Position Finder apparatus and method using optically projected reference" (Pub. No.: US 2020/0033113 A1) that describes other apparatus and methods for coding the individual patterns to make their position recoverable from the composite pattern.

The pattern generator 2 of FIG. 8 splits, through amplitude splitting, the laser 1 light into the light representing the individual pattern 5 and the laser illumination path 10 light. In this specific embodiment the pattern generator 2 scatters the laser 1 light into three assemblies of patches creating three individual patterns. FIGS. 7 and 8 show that one or all the laser 1, the pattern generator 2, the support 3, and the camera 4 can be equipped with temperature sensors 7 and heat pumps 8. The temperature sensors 7 are either thermistors or RTD (Resistance Temperature Detector), and the heat pumps 8 are Peltier elements or simply electronic resistors, all connected to the computer 6.

A calibration sequence keeps the laser 1 and the camera 4 turned on and places the embodiments of FIG. 7 or FIG. 8 in a state of calibration by paying special attention to high mechanical stability and given/defined temperatures. Referring to FIG. 7 and FIG. 8 the laser 1, the pattern generator 2, the support 3, and the camera 4 can by computer 6 control and monitoring all be set to given temperature calibration states. The computer 6 sets the temperatures by controlling the power of the heat pumps 8 and reading the corresponding temperatures of the temperature sensors 7 by PID (Proportional, Integration, Derivation) control cycles. After the embodiments represented by FIG. 7 or FIG. 8 are set to their calibration conditions the computer 6 records these conditions by recording, concurrently with the recording of the temperatures of the temperature sensors 7, a camera 4 composite pattern minimum containing the individual patterns. Since this is a calibration sequence that may take time, many sequences can be recorded to reduce random errors. In this example the embodiment is arranging the light representing the individual patterns 5 to make them not overlap on the camera 4 photosensitive surface. This makes it simple to single out the different individual patterns from the composite pattern by addressing their positions on the camera 4 photosensitive surface.

By use of optical scattering and diffraction equations the computer 6 relates the individual pattern positions, as recorded by the camera 4, to the laser wavelength and the exact geometrical relation between the laser 1, the pattern generator 2, and the camera 4. Optical scattering and diffraction equations are found in the reference "Speckle motions induced by rigid-body movements in free space geometry: an explicit investigation and extension to new cases, June 1979, Applied Optics 18(12):2022-32", and in its list of references. The computer 6 calculates pattern responsivity parameters by simulating displacements of the laser 1 in the XYZ-direction relative to the pattern generator 2, by simulating the shift of the laser 1 wavelength, and by simulating displacements of the camera 4 in the YZ-direction relative to the pattern generator 2 and calculating the corresponding individual pattern position displacements as recorded by the camera 4. This results in a 6×6 responsivity matrix called R. To simulate changes outside the linear regime the optical scattering and diffraction equations should be repeated for another exact geometrical relation that also will be called R.

In this example embodiments two monitoring sequences are described. The first embodiments are illustrated in FIG. 7 and FIG. 8. The second embodiment is illustrated in FIG. 9. In the first embodiment the computer 6 sets the temperatures to values close to the calibration values by controlling the power of the heat pumps 8 and reading the corresponding temperatures of the temperature sensors 7 by PID (Proportional, Integration, Derivation) control cycles. Whenever the laser 1 XYZ-position and wavelength need to be monitored the computer 6 records a composite pattern from the camera 4 concurrently with the temperature readings from the temperature sensors 7. The computer 6 calculates the monitoring XY-pattern position displacements of the calibration individual patterns relative to the corresponding patterns of the monitoring composite pattern. These displacements are represented by the six-element vector v. To find the laser 1 XYZ position displacement and wavelength shift, relative to the laser calibration position and wavelength, the vector v is multiplied with the inverse responsivity matrix R.

The laser 1 temperature control shall ensure that the laser 1 wavelength stays away from the steps of the laser 1 wavelength-temperature staircase relation. By including the measurement of the camera 4 YZ position displacement in this inversion calculation the camera 4 YZ position displacement are corrected for. Additional displacements due to thermal expansion the pattern generator 2 relative to the support 3 may be compensated for. This compensation applies data, recorded during calibration temperature offset measurements, and knowledge of components sizes and the thermal expansion coefficients of the materials used.

The second monitoring embodiment is illustrated in FIG. 9. The calibration step depends on embodiments as illustrated in FIG. 7 and FIG. 8, but in this monitoring embodiment the pattern generator 2 is removed and all monitoring depends on the temperature sensors 7. This is a practical approach if it is difficult to avoid that the pattern generator 2 during calibration blocks some or all the laser illumination (optics/collimator) 9 light paths. The computer 6 then sets the temperatures to values close to the calibration values by controlling the power of the heat pumps 8 and reading the corresponding temperatures of the temperature sensors 7 by PID (Proportional, Integration, Derivation) control cycles. Whenever the laser 1 XYZ-position and wavelength need to be monitored the computer 6 records the temperature from the temperature sensors 7. The temperature control shall ensure that additional laser 1 wavelength shift and laser 1 position displacements relative to the support 3 are small and can be compensated for. This compensation applies data, recorded during calibration temperature offset measurements, and knowledge of components sizes and the thermal expansion coefficients of the materials used. Note that although each of the temperature monitoring values are one-dimensional the calibration ensures that through lookup the full laser 1 XYZ position displacement and wavelength shift can be estimated. FIG. 9 shows that the camera 4 is in place, although it does not play an active monitoring role. But the fact that the camera 4 is in place, and is turned on, helps reduce uncertainties related to the estimation of the temperature distribution and the accuracy of resulting compensation. However, this monitoring embodiment will still work if also the camera 4 is removed.

Example 4

Embodiments of the disclosure will now be described with the reference to FIGS. all describing different aspects of the calibration and monitoring of a laser 11 XYZ position displacement and wavelength shift. These embodiments illustrate how a parallel calibration and monitoring of a camera XYZ position displacement can favorably be combined with the calibration and monitoring of the laser wavelength shift and position displacement/pointing direction change. These embodiments link the calibration of laser changes even stronger to the position of the support 3.

Figure 10:
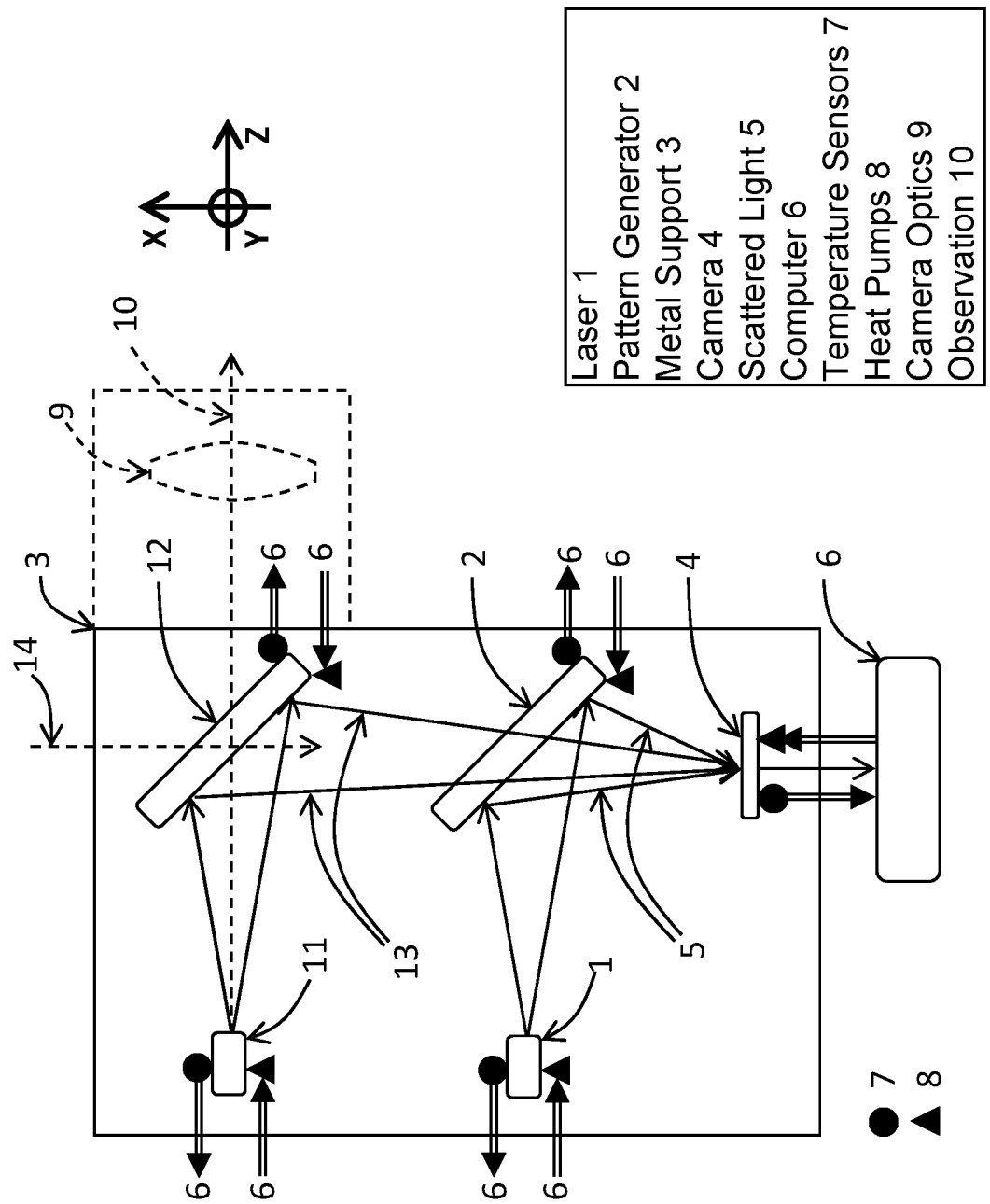
FIG. 10 is a schematic drawing illustrating an exemplary embodiment equipped with two devices according to the present disclosure. One device calibrates and monitors the wavelength and position of a laser placed in a pre-illumination optics arrangement. The other device calibrates and monitors the position of a camera.

FIG. 10 illustrates an embodiment that calibrate and monitor a laser 11 XYZ position displacement and wavelength shift in a pre-illumination optics 9 arrangement. As indicated by the dashed line, representing an additional camera observation path 14, this embodiment may also enable the calibrated camera 4 to observe some external features in the surroundings. The laser 1 and pattern generator 2 are used to calibrate and monitor the camera 4 XYZ position as exemplified by the descriptions referring to FIG. 1 and FIG. 2. The pattern generator 12 and the camera 4 are used to monitor and calibrate the Laser 11 XYZ position displacement and wavelength shift as exemplified the descriptions referring to FIG. 7 and FIG. 8. But since this embodiment explicitly calibrates the camera 4 XYZ displacement, the geometrical arrangement of the pattern generator 12 is reduced to the create contributions from two individual patterns rather than three.

Figure 11:
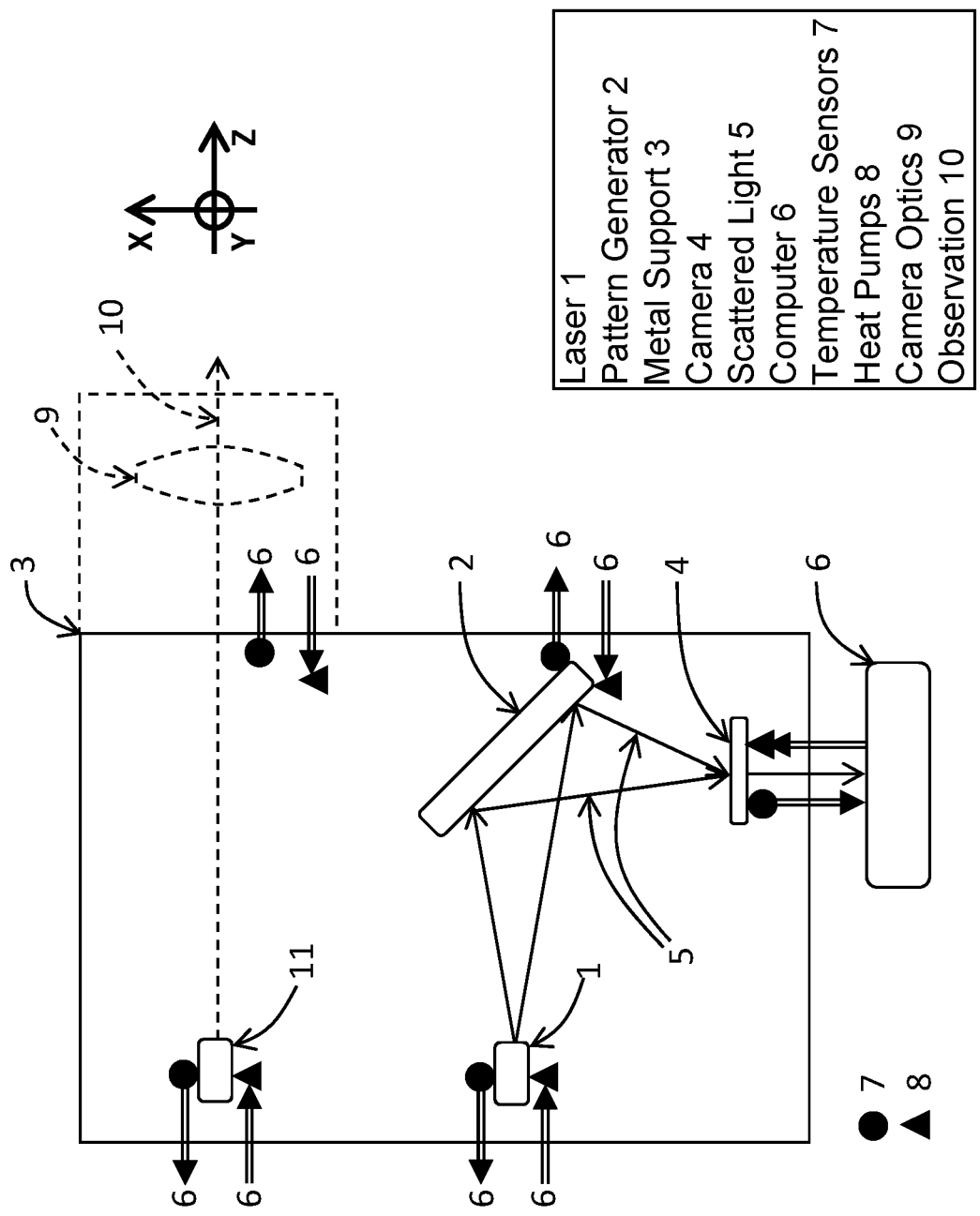
FIG. 11 is a schematic drawing illustrating an exemplary embodiment equipped with the monitoring part of a device according to the present disclosure. This part is used to monitor the wavelength and position of a laser placed in a pre-illumination optics arrangement.

FIG. 11 illustrates an embodiment that can be used to monitor a laser 11 XYZ position displacement and wavelength shift in a pre-illumination optics 9 arrangement that previously has been calibrated by the embodiment as exemplified by the descriptions referring to FIG. 10. This monitoring is exemplified by the description referring to FIG. 9.

Figure 12:
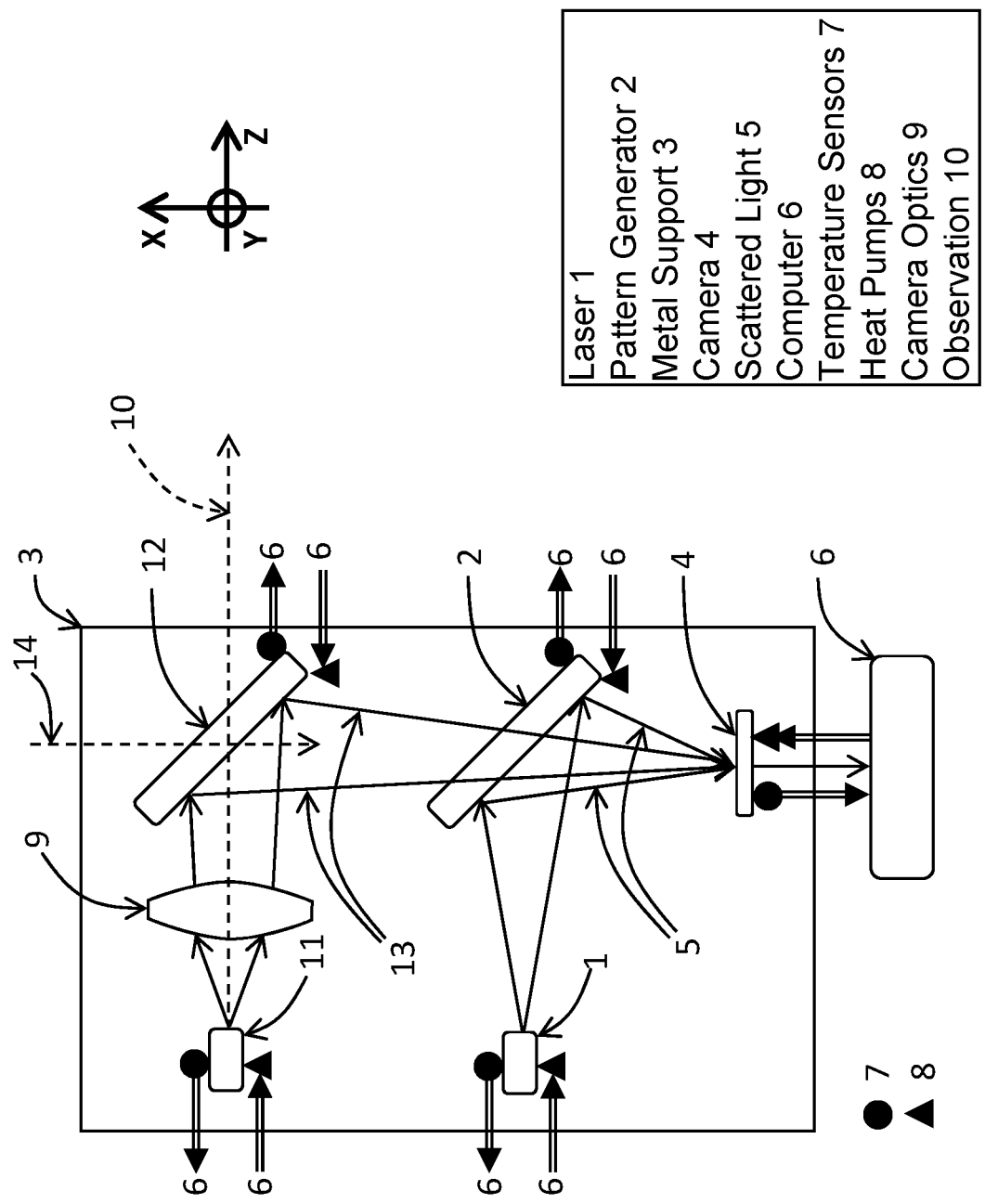
FIG. 12 is a schematic drawing illustrating an exemplary embodiment equipped with two devices according to the present disclosure. One device calibrates and monitors the wavelength and position of a laser placed in a post-illumination optics arrangement. The other device calibrates and monitors the position of a camera.

FIG. 12 illustrates an embodiment that can be used to calibrate and monitor a laser 11 XYZ position displacement and wavelength shift in a post-illumination optics 9 arrangement. As indicated by the dashed line, representing an additional camera observation path 14, this embodiment may also enable the calibrated camera 4 to observe some external features in the surroundings. The laser 1 and pattern generator 2 are used to calibrate and monitor the camera 4 XYZ position as exemplified by the descriptions referring to FIG. 1 and FIG. 2. The pattern generator 12 and the camera 4 are used to monitor and calibrate the Laser 11 XYZ position displacement and wavelength shift in a post-illumination arrangement exemplified by the parallel description referring to FIG. 4 and FIG. 5, but where the laser 1 and the camera 4 have switched position.

Figure 13:
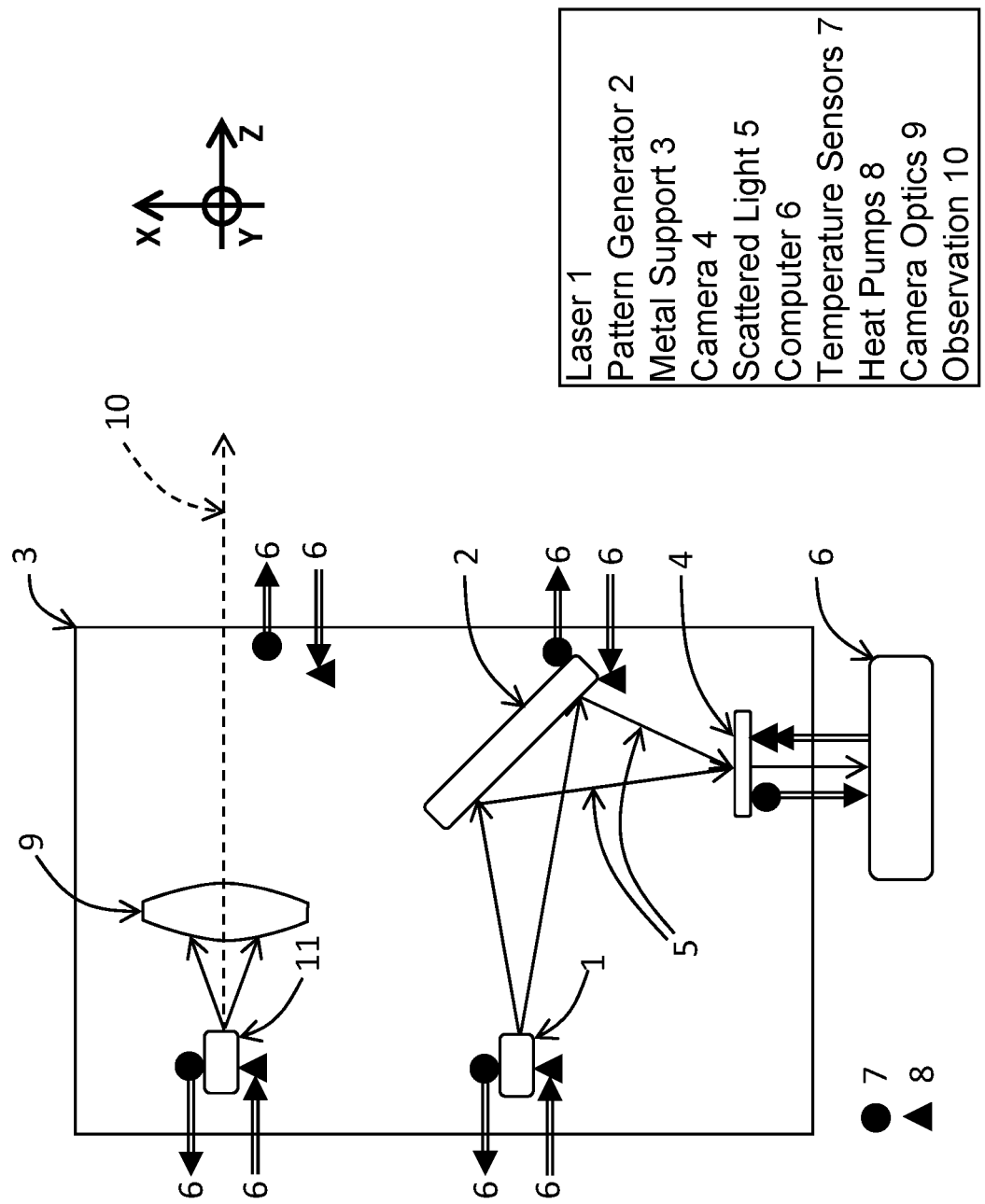
FIG. 13 is a schematic drawing illustrating an exemplary embodiment equipped with the monitoring part of a device according to the present disclosure. This part is used to monitor the wavelength and position of a laser placed in a pre-illumination optics arrangement.

FIG. 13 illustrates an embodiment that can be used to monitor a laser 11 XYZ position displacement and wavelength shift in a post-illumination optics 9 arrangement that previously has been calibrated by the embodiment as exemplified by the descriptions referring to FIG. 12. This monitoring is exemplified by the description referring to FIG. 9.

Figure 14:
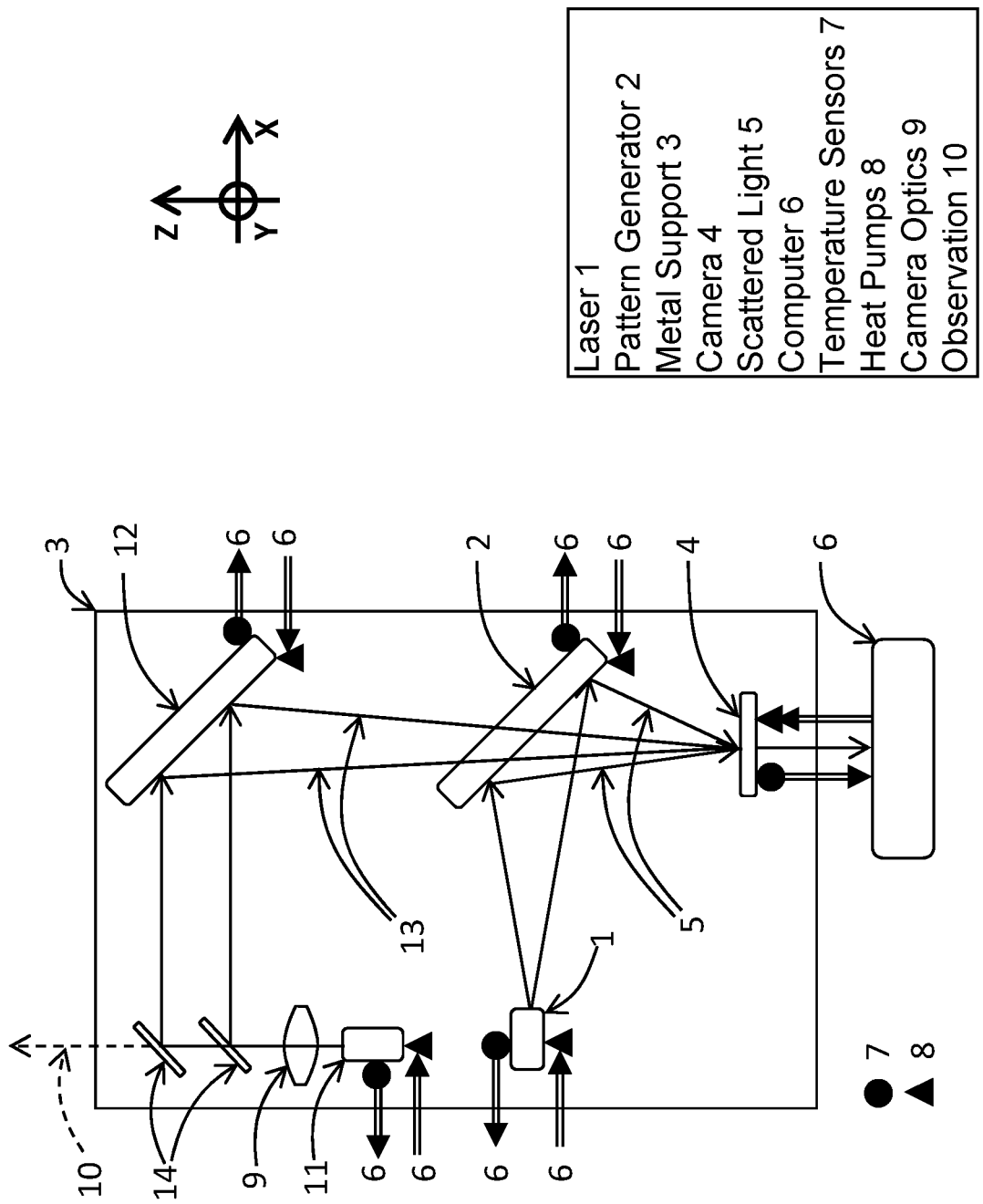
FIG. 14 is a schematic drawing illustrating an exemplary embodiment equipped with two devices according to the present disclosure. One device calibrates and monitors the wavelength and position of a laser placed in a post-illumination optics arrangement. The other device calibrates and monitors the position of a camera.

FIG. 14 illustrates an embodiment that can be used to calibrate and monitor a laser 11 XYZ position displacement and wavelength shift in a post-illumination optics 9 arrangement where the pattern generator 12 is placed outside the laser illumination path 10. In this embodiment the beam splitters 14 splits the laser 11 light into an illumination path 10 and a calibration/monitoring path. The laser 1 and pattern generator 2 are used to calibrate and monitor the camera 4 XYZ position as exemplified by the descriptions referring to FIG. 1 and FIG. 2. The pattern generator 12 and the camera 4 are used to monitor and calibrate the Laser 11 XYZ position displacement and wavelength shift in a post-illumination arrangement exemplified by the parallel description referring to FIG. 4 and FIG. 5, but where the laser 1 and the camera 4 have switched position.

Embodiments

1. A device for calibrating and monitoring the position displacement of a camera relative to a support
   wherein the device comprises
      a pattern generator,
      a laser,
      one or several heat pumps,
      one or several temperature sensors,
      a computer,
   wherein the device is configurable to make the laser illuminate the pattern generator and
   enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, camera position displacement by means of the responsivity parameters and displacements between corresponding individual patterns.

2. A device for calibrating and monitoring a laser wavelength shift and the laser position displacement relative to a support,
   wherein the device comprises
      a pattern generator,
      a camera,
      one or several heat pumps, one or several temperature sensors,
a computer,
wherein the device is configurable to make the laser illuminate the pattern generator and
enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, laser position displacement and laser wavelength shift by means of the responsivity parameters and displacements between corresponding individual patterns.

3. A method for calibrating and monitoring the position displacement of a camera relative to a support,
the method comprising in a calibration step:
Illuminating a pattern generator with laser light;
controlling and recording the temperature of one or several of the laser, the pattern generator, the camera, and the support by means of a heat pump and a temperature sensor;
recording by use of the camera and a computer individual patterns of light reflected by the pattern generator, or transmitted through the pattern generator;
recording by use of the camera and computer a composite pattern of light consisting of the individual patterns concurrently with the recording of the temperatures of the temperature sensors;
calculating from minimum a composite pattern the position displacement of the individual pattern components;
calculating the individual pattern responsivity parameters relating the camera and laser position displacements and laser wavelength shift to the geometrical configuration of the laser, the pattern generator, and the camera;
the method further comprising a monitoring step, wherein the monitoring step is either a first monitoring step or a second monitoring step,
wherein the first monitoring step comprises:
Illuminating a pattern generator with laser light;
controlling and recording the temperature of one or several of the laser, the pattern generator, the camera, and the support by means of a heat pump and a temperature sensor;
recording by use of the camera and computer a composite pattern of light consisting of the individual pattern components concurrently with the recording of the temperatures of the temperature sensors;
calculating from minimum a composite pattern the position displacement of the individual pattern components;
calculating the camera position displacement by use of the individual pattern displacements, and the responsivity parameters;
wherein the second monitoring step comprises:
controlling and recording the temperature of one or several of the laser, the camera, and the support by means of a heat pump and a temperature sensor;
calculating the camera position displacement from the monitoring temperature recordings and the calibration responsivity relations between the camera and laser position displacement, laser wavelength shift, and temperature recordings.

4. A method for calibrating and monitoring a laser wavelength shift and the laser position displacement relative to a support,
the method comprising in a calibration step:
Illuminating a pattern generator with laser light;
controlling and recording the temperature of one or several of the laser, the pattern generator, the camera, and the support by means of a heat pump and a temperature sensor;
recording by use of the camera and a computer individual patterns of light reflected by the pattern generator, or transmitted through the pattern generator;
recording by use of the camera and computer a composite pattern of light consisting of the individual patterns concurrently with the recording of the temperatures of the temperature sensors;
calculating from minimum a composite pattern the position displacement of the individual pattern components;
calculating the individual pattern responsivity parameters relating the camera and laser position displacements and laser wavelength shift to the geometrical configuration of the laser, the pattern generator, and the camera;
the method further comprising a monitoring step, wherein the monitoring step is either a first monitoring step or a second monitoring step,
wherein the first monitoring step comprises:
Illuminating a pattern generator with laser light;
controlling and recording the temperature of one or several of the laser, the pattern generator, the camera, and the support by means of a heat pump and a temperature sensor;
recording by use of the camera and computer a composite pattern of light consisting of the individual pattern components concurrently with the recording of the temperatures of the temperature sensors;
calculating from minimum a composite pattern the position displacement of the individual pattern components;
calculating the laser wavelength shift and the laser position displacement by use of the individual pattern displacements, and the responsivity parameters;
wherein the second monitoring step comprises:
controlling and recording the temperature of one or several of the laser, the camera, and the support by means of a heat pump and a temperature sensor;
calculating the laser wavelength shift and the laser position displacement, from the monitoring temperature recordings and the calibration responsivity relations between the camera and laser position displacement, laser wavelength shift, and temperature recordings.

5. An apparatus combining the devices of EMBODIMENT 1 and EMBODIMENT 2 wherein a camera position displacement is calibrated and monitored according to EMBODIMENT 1 thereby helping more accurate calibration and monitoring of the laser wavelength shift and position displacement according to EMBODIMENT 2.

6. An apparatus combining the devices of EMBODIMENT 1 and EMBODIMENT 2 wherein a laser wavelength shift and position displacement is calibrated and monitored according to EMBODIMENT 2 thereby helping more accurate calibration and monitoring of the camera position displacement according to EMBODIMENT 1.

7. A method combining the methods of EMBODIMENT 3 and EMBODIMENT 4 wherein a camera position displacement is calibrated and monitored according to EMBODIMENT 3 thereby helping more accurate calibration and monitoring of the laser wavelength shift and position displacement according to EMBODIMENT 4.

8. A method combining the methods of EMBODIMENT 3 and EMBODIMENT 4 wherein a laser wavelength shift and position displacement is calibrated and monitored according to EMBODIMENT 4 thereby helping more accurate calibration and monitoring of the camera position displacement according to EMBODIMENT 3.

9. The laser according to EMBODIMENTS 2 and 4 is a gas laser, a solid-state laser, a fiber laser, a liquid dye laser, or a semiconductor laser that is equipped with illumination optics.

10. The pattern generator according to the EMBODIMENTS 1-4 is a scattering surface, or a computer-generated reflection mask, or a stratified or not stratified diffractive optical element (DOE), or a computer-generated hologram (CGH), each either placed in a reflection or transmission geometry.

11. The camera according to the EMBODIMENTS 1 and 3 is equipped with observation optics.

12. The computer according to EMBODIMENTS 1-4 contains one processor connected to the camera and another processor connected to the heat pump and temperature sensors.

13. The laser and the camera according to the EMBODIMENTS 1-4 are each placed on a separate stationary or moving support relative to the support.

14. The calibration step according to the EMBODIMENTS 3 and 4 can be conducted before, during, or after the monitoring steps.

The invention claimed is:

1. A device for calibrating and monitoring the position displacement of a camera relative to a support,
wherein the device comprises
a pattern generator,
a laser,
one or several heat pumps,
one or several temperature sensors, and
a computer,
wherein the device is configurable to make the laser illuminate the pattern generator and enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, camera position displacement by means of the responsivity parameters and displacements between corresponding individual patterns.

2. An apparatus combining a first device and a second device, the first device being the device of claim 1, the second device being a device for calibrating and monitoring a laser wavelength shift and the laser position displacement relative to a support,
wherein the device comprises
a pattern generator,
a camera,
one or several heat pumps,
one or several temperature sensors, and
a computer,
wherein the device is configurable to make the laser illuminate the pattern generator and enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, laser position displacement and laser wavelength shift by means of the responsivity parameters and displacements between corresponding individual patterns,
wherein a camera position displacement is calibrated and monitored according to the first device thereby helping more accurate calibration and monitoring of the laser wavelength shift and position displacement according to the second device.

3. An apparatus combining a first device and a second device, the first device being the device of claim 1, the second device being a device for calibrating and monitoring a laser wavelength shift and the laser position displacement relative to a support,
wherein the device comprises
a pattern generator,
a camera,
one or several heat pumps,
one or several temperature sensors, and
a computer,
wherein the device is configurable to make the laser illuminate the pattern generator and enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, laser position displacement and laser wavelength shift by means of the responsivity parameters and displacements between corresponding individual patterns,
wherein a laser wavelength shift and position displacement are calibrated and monitored according to the second device thereby helping more accurate calibration and monitoring of the camera position displacement according to the first device.

4. The apparatus according to the claim 1, wherein the laser is a gas laser, a solid-state laser, a fiber laser, a liquid dye laser, or a semiconductor laser that is equipped with illumination optics.

5. The apparatus according to claim 1, wherein the pattern generator is a scattering surface, a computer-generated reflection mask, a stratified or not stratified diffractive optical element (DOE), or a computer-generated hologram (CGH), each either placed in a reflection or transmission geometry.

6. The apparatus of claim 1, wherein the camera is equipped with observation optics.

7. The apparatus of claim 1, wherein the computer contains a processor connected to the camera and another processor connected to the heat pump and temperature sensors.

8. The apparatus of claim 1, wherein the laser and the camera are each placed on a separate stationary or moving support relative to the support.

9. A device for calibrating and monitoring a laser wavelength shift and the laser position displacement relative to a support,
   wherein the device comprises
      a pattern generator,
      a camera,
      one or several heat pumps,
      one or several temperature sensors, and
      a computer,
   wherein the device is configurable to make the laser illuminate the pattern generator and enable the camera and computer to record several individual patterns, and a composite pattern containing those individual patterns, enable by means of the heat pump and temperature sensor to control and record the temperature of one or several of the laser, pattern generator, camera, and the support, comprising the means to calculate pattern position displacements between corresponding individual patterns from composite patterns, responsivity parameters of the camera and laser position displacement and laser wavelength shift, laser position displacement and laser wavelength shift by means of the responsivity parameters and displacements between corresponding individual patterns.

10. The apparatus according to the claim 9, wherein the laser is a gas laser, a solid-state laser, a fiber laser, a liquid dye laser, or a semiconductor laser that is equipped with illumination optics.

11. The apparatus according to claim 9, wherein the pattern generator is a scattering surface, a computer-generated reflection mask, a stratified or not stratified diffractive optical element (DOE), or a computer-generated hologram (CGH), each either placed in a reflection or transmission geometry.

12. The apparatus of claim 9, wherein the computer contains a processor connected to the camera and another processor connected to the heat pump and temperature sensors.

13. The apparatus of claim 9, wherein the laser and the camera are each placed on a separate stationary or moving support relative to the support.

14. A method for calibrating and monitoring the position displacement of a camera relative to a support,
   the method comprising in a calibration step:
   illuminating a pattern generator with laser light from a laser;
   controlling and recording the temperature of one or several of the laser, the pattern generator, the camera, and the support by means of a heat pump and a temperature sensor;
   recording by use of the camera and a computer individual patterns of light reflected by the pattern generator, or transmitted through the pattern generator;
   recording by use of the camera and computer a composite pattern of light consisting of the individual patterns concurrently with the recording of the temperatures of the temperature sensors;
   calculating from minimum a composite pattern the position displacement of the individual pattern components;
   calculating the individual pattern responsivity parameters relating the camera and laser position displacements and laser wavelength shift to the geometrical configuration of the laser, the pattern generator, and the camera;
   the method further comprising a monitoring step, wherein the monitoring step is either a first monitoring step or a second monitoring step,
   wherein the first monitoring step comprises:
   Illuminating a pattern generator with laser light;
   controlling and recording the temperature of one or several of the laser, the pattern generator, the camera, and the support by means of a heat pump and a temperature sensor;
   recording by use of the camera and computer a composite pattern of light consisting of the individual pattern components concurrently with the recording of the temperatures of the temperature sensors;
   calculating from minimum a composite pattern the position displacement of the individual pattern components;
   calculating the camera position displacement by use of the individual pattern displacements, and the responsivity parameters;
   wherein the second monitoring step comprises:
   controlling and recording the temperature of one or several of the laser, the camera, and the support by means of a heat pump and a temperature sensor;
   calculating the camera position displacement from the monitoring temperature recordings and the calibration responsivity relations between the camera and laser position displacement, laser wavelength shift, and temperature recordings.

15. A method combining a first method and a second method, the first method being the method of claim 14, the second method being a method for calibrating and monitoring a laser wavelength shift and the laser position displacement relative to a support,
   the method comprising in a calibration step:
   Illuminating a pattern generator with laser light from a laser;
   controlling and recording the temperature of one or several of the laser, the pattern generator, the camera, and the support by means of a heat pump and a temperature sensor;
   recording by use of the camera and a computer individual patterns of light reflected by the pattern generator, or transmitted through the pattern generator;
   recording by use of the camera and computer a composite pattern of light consisting of the individual patterns concurrently with the recording of the temperatures of the temperature sensors;
   calculating from minimum a composite pattern the position displacement of the individual pattern components;
   calculating the individual pattern responsivity parameters relating the camera and laser position displacements and laser wavelength shift to the geometrical configuration of the laser, the pattern generator, and the camera;
   the method further comprising a monitoring step, wherein the monitoring step is either a first monitoring step or a second monitoring step,
   wherein the first monitoring step comprises:
   Illuminating a pattern generator with laser light;

controlling and recording the temperature of one or several of the laser, the pattern generator, the camera, and the support by means of a heat pump and a temperature sensor;

recording by use of the camera and computer a composite pattern of light consisting of the individual pattern components concurrently with the recording of the temperatures of the temperature sensors;

calculating from minimum a composite pattern the position displacement of the individual pattern components;

calculating the laser wavelength shift and the laser position displacement by use of the individual pattern displacements, and the responsivity parameters;

wherein the second monitoring step comprises:

controlling and recording the temperature of one or several of the laser, the camera, and the support by means of a heat pump and a temperature sensor;

calculating the laser wavelength shift and the laser position displacement, from the monitoring temperature recordings and the calibration responsivity relations between the camera and laser position displacement, laser wavelength shift, and temperature recordings, wherein a camera position displacement is calibrated and monitored according to the first method thereby helping more accurate calibration and monitoring of the laser wavelength shift and position displacement according to the second method.

16. A method combining a first method and a second method, the first method being the method of claim 14, the second method being a method for calibrating and monitoring a laser wavelength shift and the laser position displacement relative to a support, the method comprising in a calibration step:

Illuminating a pattern generator with laser light from a laser;

controlling and recording the temperature of one or several of the laser, the pattern generator, the camera, and the support by means of a heat pump and a temperature sensor;

recording by use of the camera and a computer individual patterns of light reflected by the pattern generator, or transmitted through the pattern generator;

recording by use of the camera and computer a composite pattern of light consisting of the individual patterns concurrently with the recording of the temperatures of the temperature sensors;

calculating from minimum a composite pattern the position displacement of the individual pattern components;

calculating the individual pattern responsivity parameters relating the camera and laser position displacements and laser wavelength shift to the geometrical configuration of the laser, the pattern generator, and the camera;

the method further comprising a monitoring step, wherein the monitoring step is either a first monitoring step or a second monitoring step, wherein the first monitoring step comprises:

Illuminating a pattern generator with laser light;

controlling and recording the temperature of one or several of the laser, the pattern generator, the camera, and the support by means of a heat pump and a temperature sensor;

recording by use of the camera and computer a composite pattern of light consisting of the individual pattern components concurrently with the recording of the temperatures of the temperature sensors;

calculating from minimum a composite pattern the position displacement of the individual pattern components;

calculating the laser wavelength shift and the laser position displacement by use of the individual pattern displacements, and the responsivity parameters;

wherein the second monitoring step comprises:

controlling and recording the temperature of one or several of the laser, the camera, and the support by means of a heat pump and a temperature sensor;

calculating the laser wavelength shift and the laser position displacement, from the monitoring temperature recordings and the calibration responsivity relations between the camera and laser position displacement, laser wavelength shift, and temperature recordings, wherein a laser wavelength shift and position displacement are calibrated and monitored according to the second method thereby helping more accurate calibration and monitoring of the camera position displacement according to the first method.

17. The method according to the claim 14, wherein the laser is a gas laser, a solid-state laser, a fiber laser, a liquid dye laser, or a semiconductor laser that is equipped with illumination optics.

18. The method according to claim 14, wherein the pattern generator is a scattering surface, a computer-generated reflection mask, a stratified or not stratified diffractive optical element (DOE), or a computer-generated hologram (CGH), each either placed in a reflection or transmission geometry.

19. The method of claim 14, wherein the camera is equipped with observation optics.

20. The method of claim 14, wherein the computer contains a processor connected to the camera and another processor connected to the heat pump and temperature sensors.

21. The method of claim 14, wherein the laser and the camera are each placed on a separate stationary or moving support relative to the support.

22. The method of claim 14, wherein the calibration step is conducted before, during, or after the monitoring steps.

23. A method for calibrating and monitoring a laser wavelength shift and the laser position displacement relative to a support, the method comprising in a calibration step:

Illuminating a pattern generator with laser light from a laser;

controlling and recording the temperature of one or several of the laser, the pattern generator, the camera, and the support by means of a heat pump and a temperature sensor;

recording by use of the camera and a computer individual patterns of light reflected by the pattern generator, or transmitted through the pattern generator;

recording by use of the camera and computer a composite pattern of light consisting of the individual patterns concurrently with the recording of the temperatures of the temperature sensors;

calculating from minimum a composite pattern the position displacement of the individual pattern components;

calculating the individual pattern responsivity parameters relating the camera and laser position displacements and laser wavelength shift to the geometrical configuration of the laser, the pattern generator, and the camera;

the method further comprising a monitoring step, wherein the monitoring step is either a first monitoring step or a second monitoring step, wherein the first monitoring step comprises:

Illuminating a pattern generator with laser light;

controlling and recording the temperature of one or several of the laser, the pattern generator, the camera, and the support by means of a heat pump and a temperature sensor;

recording by use of the camera and computer a composite pattern of light consisting of the individual pattern components concurrently with the recording of the temperatures of the temperature sensors;

calculating from minimum a composite pattern the position displacement of the individual pattern components;

calculating the laser wavelength shift and the laser position displacement by use of the individual pattern displacements, and the responsivity parameters;

wherein the second monitoring step comprises:

controlling and recording the temperature of one or several of the laser, the camera, and the support by means of a heat pump and a temperature sensor;

calculating the laser wavelength shift and the laser position displacement, from the monitoring temperature recordings and the calibration responsivity relations between the camera and laser position displacement, laser wavelength shift, and temperature recordings.

24. The method according to the claim 23, wherein the laser is a gas laser, a solid-state laser, a fiber laser, a liquid dye laser, or a semiconductor laser that is equipped with illumination optics.

25. The method according to claim 23, wherein the pattern generator is a scattering surface, a computer-generated reflection mask, a stratified or not stratified diffractive optical element (DOE), or a computer-generated hologram (CGH), each either placed in a reflection or transmission geometry.

26. The method of claim 23, wherein the computer contains a processor connected to the camera and another processor connected to the heat pump and temperature sensors.

27. The method of claim 23, wherein the laser and the camera are each placed on a separate stationary or moving support relative to the support.

28. The method of claim 23, wherein the calibration step is conducted before, during, or after the monitoring steps.

* * * * *